United States Patent
Nishikawa et al.

(10) Patent No.: US 10,523,897 B2
(45) Date of Patent: Dec. 31, 2019

(54) INFORMATION PROCESSING METHOD, INFORMATION PROCESSING SYSTEM, AND INFORMATION PROCESSING APPARATUS

(71) Applicant: Panasonic Intellectual Property Management Co., Ltd., Osaka (JP)

(72) Inventors: Yuri Nishikawa, Kanagawa (JP); Masayuki Misaki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/690,279

(22) Filed: Aug. 30, 2017

(65) Prior Publication Data

US 2018/0070052 A1 Mar. 8, 2018

(30) Foreign Application Priority Data

Sep. 7, 2016 (JP) .................. 2016-174545
May 15, 2017 (JP) .................. 2017-096248

(51) Int. Cl.
*H04N 7/15* (2006.01)
*H04L 29/06* (2006.01)
*G06Q 10/10* (2012.01)

(52) U.S. Cl.
CPC ........... *H04N 7/15* (2013.01); *H04L 65/1069* (2013.01); *H04L 65/1073* (2013.01); *H04L 65/1083* (2013.01); *H04L 65/403* (2013.01); *G06Q 10/10* (2013.01)

(58) Field of Classification Search
CPC combination set(s) only.
See application file for complete search history.

(56) References Cited

U.S. PATENT DOCUMENTS 9,843,768 B1 * 12/2017 Negi .................. H04N 7/15
2007/0192103 A1 * 8/2007 Sato .................. G10L 17/26
704/253
2017/0287506 A1 * 10/2017 Totzke ............... G10L 25/63

FOREIGN PATENT DOCUMENTS

JP        2007-218933        8/2007

* cited by examiner

*Primary Examiner* — Phung-Hoang J Nguyen
(74) *Attorney, Agent, or Firm* — Greenblum & Bernstein, P.L.C.

(57) ABSTRACT

One or more sensor devices detect a condition of each of users. With regard to a user set including at least two of the users as elements, an information processing apparatus calculates an agreement degree representing a degree of agreement between the at least two users being the elements in the user set, based on the condition information on the at least two users which is in the obtained condition information on all the users. An information presentation device provides presentation information based on a result of the agreement degree calculation.

9 Claims, 19 Drawing Sheets

FIG. 10A

TIME: 15:50

| GROUP NAME | AGREEMENT DEGREE |
|---|---|
| SUZUKI AND SATO | 0.2 |
| SUZUKI AND YAMADA | 0.7 |
| SATO AND YAMADA | 0.1 |
| SUZUKI, SATO AND YAMADA | 0.3 |

FIG. 10B

TIME: 16:20

| GROUP NAME | AGREEMENT DEGREE |
|---|---|
| SUZUKI AND SATO | 0.8 |
| SUZUKI AND YAMADA | 0.5 |
| SATO AND YAMADA | 0.2 |
| SUZUKI, SATO AND YAMADA | 0.1 |

| KEYWORD | SUPERORDINATE CONCEPT |
|---|---|
| BASEBALL | SPORT |
| TENNIS | SPORT |
| SOCCER | SPORT |
| SUMO WRESTLING | SPORT |
| MOVIE A | MOVIE |
| MOVIE B | MOVIE |
| NOVEL C | NOVEL |

682

| INFORMATION NAME | KEYWORD | USER SET | HIGHEST AGREEMENT DEGREE |
|---|---|---|---|
| IDEA 1 | TENNIS | YAMADA AND SUZUKI | 0.6 |
| IDEA 2 | MOVIE A | YAMADA, SUZUKI AND SATO | 0.1 |
| IDEA 3 | NOVEL C | SUZUKI AND SATO | 0.2 |
| IDEA 4 | BASEBALL | YAMADA AND SUZUKI | 0.7 |

| INFORMATION NAME | KEYWORD | USER SET | HIGHEST AGREEMENT DEGREE | TIME INFORMATION |
|---|---|---|---|---|
| IDEA 1 | TENNIS | YAMADA AND SUZUKI | 0.6 | 15:47 |
| IDEA 2 | MOVIE A | YAMADA, SUZUKI AND SATO | 0.1 | 15:48 |
| IDEA 3 | NOVEL C | SUZUKI AND SATO | 0.2 | 15:49 |
| IDEA 4 | BASEBALL | YAMADA AND SUZUKI | 0.7 | 15:50 |

INFORMATION PROCESSING METHOD, INFORMATION PROCESSING SYSTEM, AND INFORMATION PROCESSING APPARATUS

BACKGROUND

1. Technical Field

The present disclosure relates to an information processing method, an information processing system, and an information processing apparatus.

2. Description of the Related Art

Japanese Patent No. 5055781 (hereinafter referred to as Patent Document 1) discloses a conversational speech analysis method for a place such as a conference where many people discuss. According to the conversational speech analysis method of Patent Document 1, conversations are analyzed by obtaining an interest level that listeners have in a discussion using signals obtained from microphones and sensors. According to Patent Document 1, how much participants are interested in discussed contents is analyzed; changes in the interest level of the participants over time are graphed; and the amounts of useful speeches in which many persons are interested are represented for each participant in diagram form.

SUMMARY

One non-limiting and exemplary embodiment provides an information processing method, an information processing system, and an information processing apparatus which are capable of presenting information depending on how much at least two of multiple users agree to each other.

In one general aspect, the techniques disclosed here feature an information processing method including: obtaining condition information indicating a condition of each of users detected by one or more sensor devices; with regard to a user set including at least two of the users as elements, calculating an agreement degree representing a degree of agreement between the at least two users being the elements in the user set, based on the condition information on the at least two users which is in the obtained condition information on all the users; and providing presentation information based on a result of the agreement degree calculation.

According to the information processing method in a mode disclosed herein, presentation information can be provided based on the degree of agreement between the at least two users.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 10A and 10B are diagrams illustrating first display examples of presentation information in Embodiment 1;

FIG. 21 is a diagram illustrating an example of an agreement degree information database in Embodiment 2.

DETAILED DESCRIPTION

Figure 1:
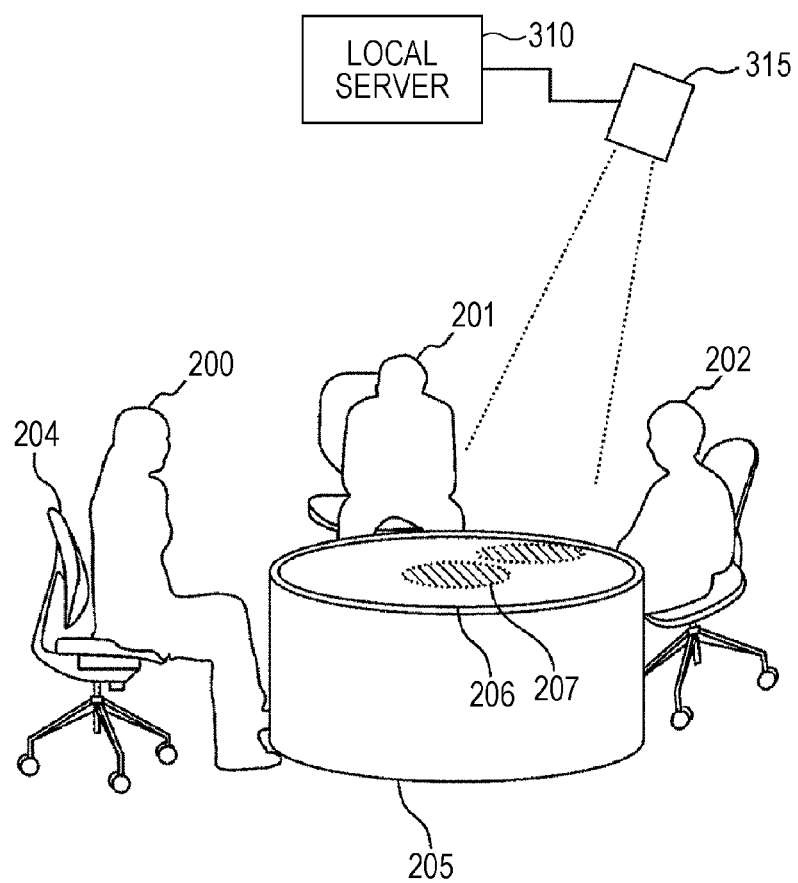
FIG. 1 is a diagram for explaining an overview of a conference support system of Embodiment 1.

Referring to the drawings, descriptions will be hereinbelow provided for embodiments included in the present disclosure.

It should be noted that the embodiments discussed hereinbelow each show comprehensive and specific examples. Numerical values, shapes, materials, components, placement locations and connection modes of the components, steps, sequences of the steps, and the like mentioned in the following embodiments are just examples, and shall not be construed as limiting the present disclosure. Furthermore, out of the components in the following embodiments, components which are not recited in independent claims representing the highest concepts are explained as optional components.

(Embodiment 1)

Referring to the drawings, descriptions will be hereinbelow provided for an information processing system, an information processing apparatus, as well as an information processing method to be performed using the system and the apparatus, in Embodiment 1. It should be noted that the embodiments will discuss an example of how to apply the information processing system, the information processing apparatus and the information processing method to conference support. The information processing system and the information processing method will be hereinafter referred to as a conference support system and a conference support method, respectively.

[0. Overview]

Referring to FIG. 1, descriptions will be provided for an overview of the conference support system of the embodiment. FIG. 1 is a diagram for explaining an overview of the system.

As illustrated in FIG. 1, the conference support system of the embodiment is used in a conference in which multiple users 200, 201, 202 participate. In the present disclosure, the "conference" means an assembly of people for discussion, and includes various types of meetings, such as a brainstorming meeting, a planning meeting, and a product monitoring meeting. Furthermore, the conference to which the system is applied is not limited to a meeting for a business purpose, and may be a symposium and the like, for example.

The system detects conditions, such as behaviors, of the users 200, 201, 202 in a conference using various sensor devices. Examples of the sensor devices include a body pressure sensor and a microphone. For example, the body pressure sensor installed in the seat of a chair 204 detects a change in body pressure of the user 200 with a change in time. For example, as a condition of the user 200, motions such as body movements are detected by the detection of the change in the body pressure of the user 200. The number of body pressure sensors to be installed in the seat of the chair 204 may be one or more. In a case where multiple body pressure sensors are installed in the seat of the chair 204, what motions the user makes can be detected more accurately.

In addition, the body pressure sensors are installed in the seats of the chairs in which the users 201, 202 are seated. In the same way as discussed above, as conditions of the users 201, 202, motions such as body movements are detected by the body pressure sensors. Furthermore, as conditions of the users 200, 201, 202 during the conference, voices uttered by the users 200, 201, 202 are obtained using microphones (see FIG. 2).

As discussed above, the conditions of the user 200, 201, 202 are detected using the various sensor devices such as the body pressure sensors and the microphones.

In this embodiment, a local server 310 performs an information analysis on sensor data representing various detection results, and extracts particular information. Information obtained through the information analysis is provided to a presentation device. Examples of the presentation device include: a display device, such as a display and a projector, which displays the information; and a voice output device, such as an earphone, a headphone and a speaker, which outputs the information in the form of voice. The embodiment discusses an example where, as the presentation device, a display device 315, such as a projector, displays presentation information 207 to be presented to the users 200 to 202 onto a display screen 206 such as on a table 205. The presentation information 207 may be presented during or after the conference. Otherwise, during a log analysis or the like after the conference, the presentation information may be presented to users who did not join the conference.

In a conference where multiple persons have a discussion, there may be a case where all the participating users 200 to 202 agree to one another, or a case where only some of them agree to each other. Depending on a group of users showing agreement during the conference (a user set), the conference support system of the embodiment extracts information on the users who show agreement during the conference. Descriptions will be hereinbelow provided for a configuration of the conference support system of the embodiment.

[1. Configuration]

[1-1. System Configuration]

Figure 2:
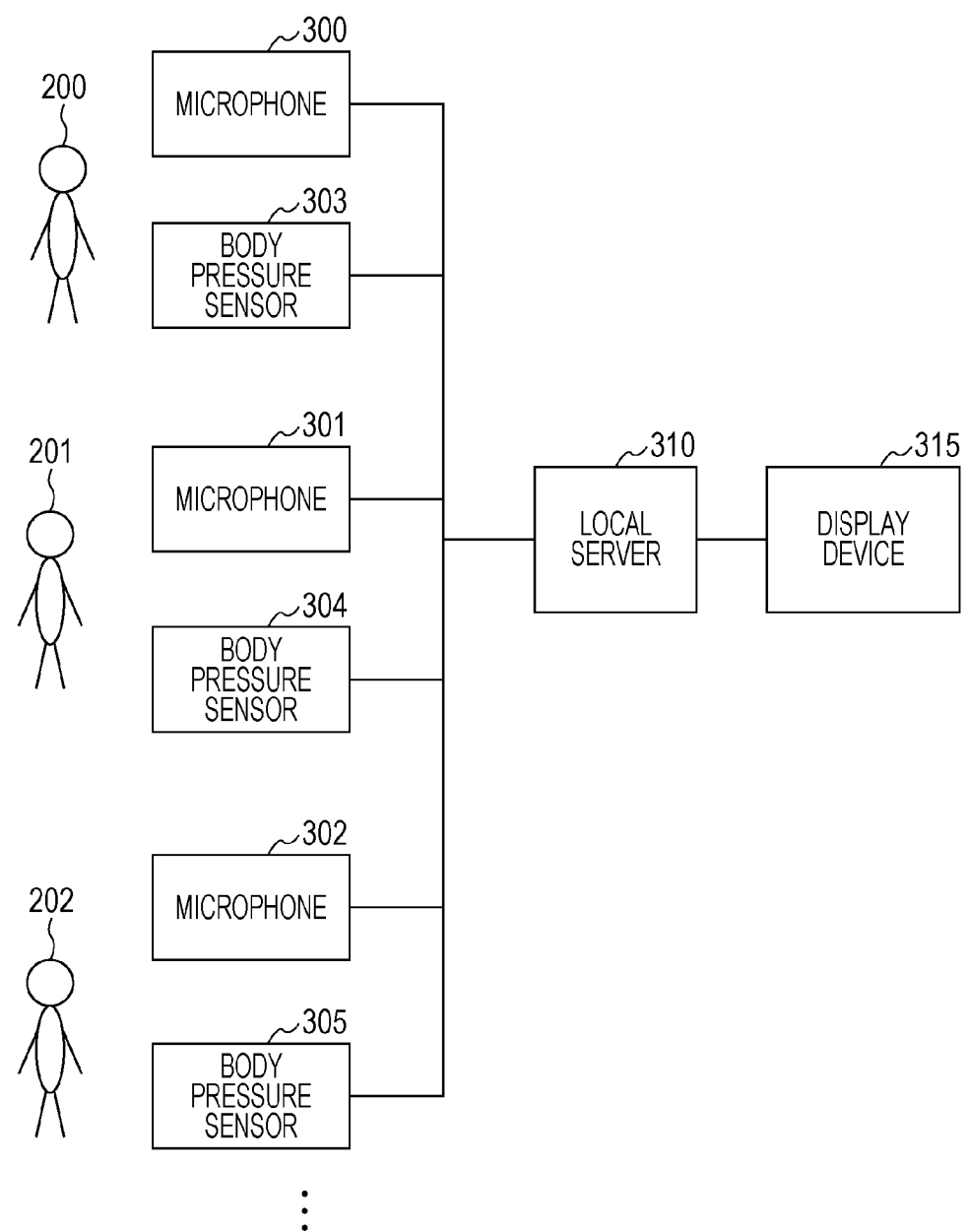
FIG. 2 is a diagram illustrating an overall configuration of the conference support system of Embodiment 1.

Referring to FIGS. 1 and 2, descriptions will be provided for an overall configuration of the conference support system of the embodiment. FIG. 2 is a diagram illustrating the overall configuration of the system.

As illustrated in FIG. 2, the conference support system of the embodiment includes multiple microphones 300 to 302, multiple body pressure sensors 303 to 305, the local server 310, and the display device 315.

The embodiment discusses an example where the system is used in a conference of three users 200, 201, 202 (see FIG. 1). In the embodiment, the microphones 300, 301, 302 and the body pressure sensors 303, 304, 305 detect the conditions of the users 200, 201, 202, respectively. Examples of a user's condition include his/her utterance, motions, and posture. The microphones 300 to 302 and the body pressure sensors 303 to 305 are examples of the sensor devices in the system. The detailed configurations of the various sensor devices 300 to 305 will be described later.

The local server 310 is an example of the information processing apparatus which processes information based on the sensor data received from the various sensor devices 300 to 305 in the system. The local server 310, for example, is connected to and communicates with the sensor devices 300 to 305 and the display device 315 through a network such as the local area network (LAN), and communicates various data to and from the sensor devices 300 to 305 and the display device 315. The details of the configuration of the local server 310 will be described later.

The display device 315 is formed, for example, from a projector, and displays information by projecting images onto the external display screen 206. The display device 315 is not limited to the projector, and may be formed, for example, from a display device including a display screen such as a liquid crystal display, or an organic electroluminescent (EL) display. The display device 315, for example, has a communication function, as well as is connected to and communicates with the local server 310 through the network such as the LAN. The display device 315 is an example of an information presentation device which displays information received from the local server 310.

[1-2. Configurations of Sensors]

The detailed configurations of the various sensor devices 300 to 305 in the system will be discussed referring to FIGS. 3 and 4.

[1-2-1. Configuration of Microphone]

Figure 3:
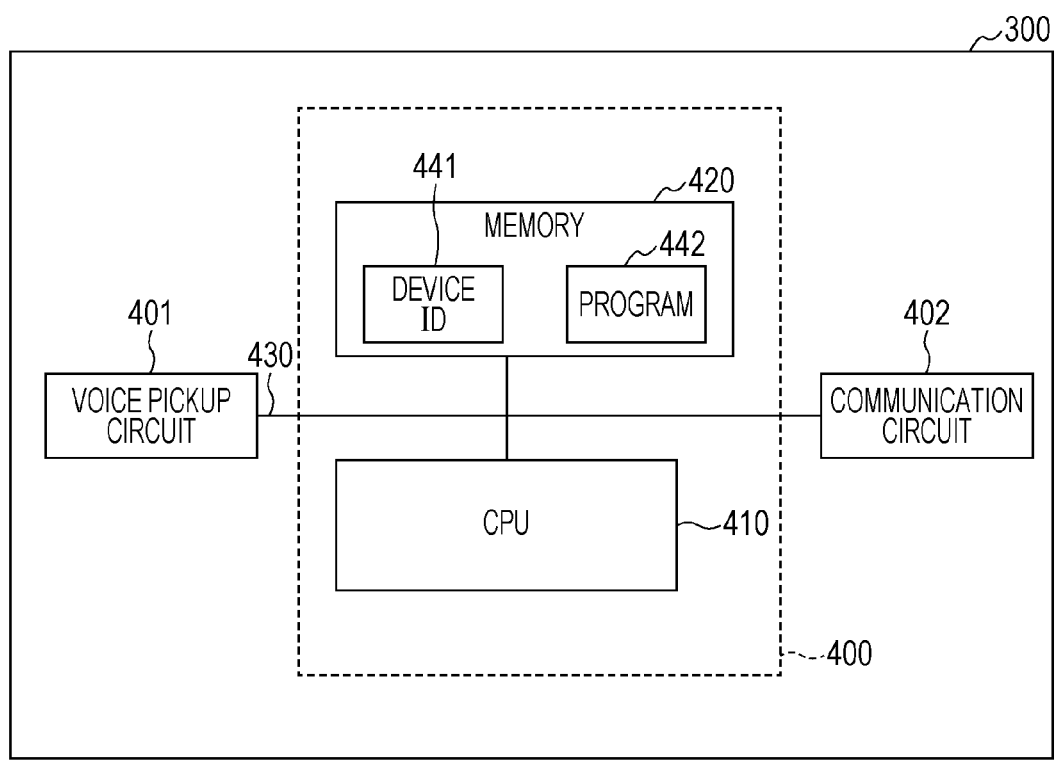
FIG. 3 is a diagram illustrating a configuration of a microphone in the conference support system.

FIG. 3 is a diagram illustrating the configuration of the microphone 300 in the system. In the embodiment, the multiple microphones 300 to 302 have the same configuration.

As illustrated in FIG. 3, the microphone 300 includes a microphone controller 400, a voice pickup circuit 401, and a communication circuit 402. The microphone controller 400 includes a central processing unit (CPU) 410, and a memory 420. In the microphone 300, the voice pickup circuit 401, the communication circuit 402, the CPU 410, and the memory 420 are connected together through a communication line 430.

The voice pickup circuit 401 picks up voices from outside the microphone 300. The vice pickup circuit 401 generates a voice signal representing a result of the voice pickup, and outputs the generated voice signal to the microphone controller 400.

The communication circuit 402 is an interface circuit which communicates data in compliance with predetermined communication standards through a wireless or wired communication line. The predetermined communication standards include IEEE802.3, IEEE802.11a/11b/11g/11ac, IEEE1395, Universal Serial Bus (USB), High-Definition Multimedia Interface (HDMI) (registered trademark), WiFi, and Bluetooth (registered trademark).

The microphone controller 400 controls the overall operation of the microphone 300. In the microphone controller 400, the CPU 410 realizes predetermined functions, for example, in cooperation with software.

The memory 420 is formed, for example, from a flash memory. The memory 420 stores a program 442 and data which are needed to realize the functions of the microphone 300. The memory 420 stores, for example, device IDs 441 which are the identification numbers of the multiple microphones 300 to 302.

The microphone controller 400 performs various arithmetic operations by reading the data and the program which are stored in the memory 420, and thereby realizes the various functions. For example, the microphone controller 400 performs a signal process based on the voice signal from the voice pickup circuit 401, and generates voice data representing a result of the voice detection by the microphone 300. The microphone controller 400 transmits the generated voice data together with the device ID 441 of the microphone 300 to the local server 310 and the like via the communication circuit 402.

The microphone controller 400 may be a hardware circuit such as a dedicated electronic circuit designed to realize the predetermined functions or a reconfigurable electronic circuit. The microphone controller 400 may be made up from various semiconductor integrated circuits such as a CPU, a micro-processing unit (MPU), a microcomputer, a digital signal processor (DSP), a field-programmable gate array (FPGA), and an application specific integrated circuit (ASIC).

It should be noted that, as discussed above, the microphones 301, 302 each have the same configuration as the microphone 300. For this reason, detailed descriptions for the microphones 301, 302 are omitted herein.

[1-2-2. Configuration of Body Pressure Sensor]

Figure 4:
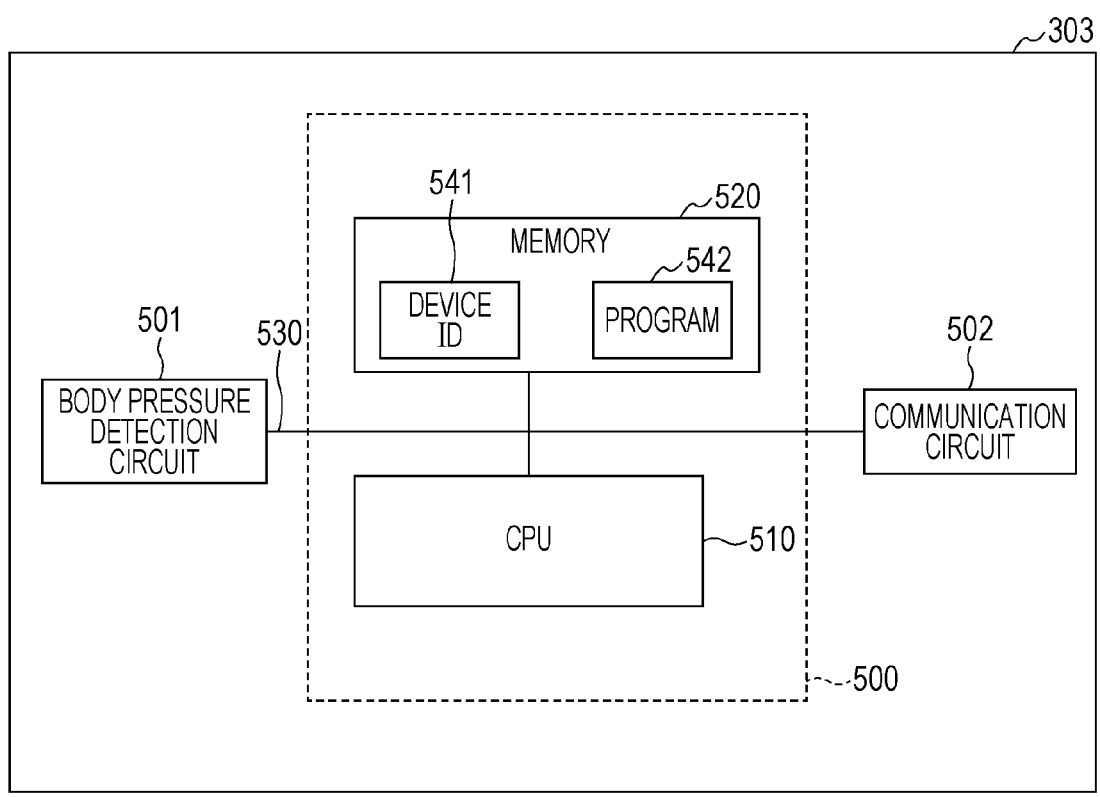
FIG. 4 is a diagram illustrating a configuration of a body pressure sensor in the conference support system.

FIG. 4 is a diagram illustrating the configuration of the body pressure sensor 303 in the system. In the embodiment, the multiple body pressure sensors 303 to 305 have the same configuration.

As illustrated in FIG. 4, the body pressure sensor 303 includes a sensor controller 500, a body pressure detection circuit 501, and a communication circuit 502. The sensor controller 500 includes a CPU 510, and a memory 520. In the body pressure sensor 303, the body pressure detection circuit 501, the communication circuit 502, the CPU 510, and the memory 520 are connected together through a signal line 530.

The body pressure detection circuit 501 detects pressure or load to be applied to the body pressure sensor 303. The body pressure detection circuit 501 generates a sensor signal representing a result of detecting the pressure and the like, and outputs the generated sensor signal to the sensor controller 500.

The communication circuit 502 is an interface circuit which communicates data in compliance with predetermined communication standards through a wireless or wired communication line. The predetermined communication standards include IEEE802.3, IEEE802.11a/11b/11g/11ac, IEEE1395, USB, HDMI, WiFi, and Bluetooth.

The sensor controller 500 controls the overall operation of the body pressure sensor 303. In the sensor controller 500, the CPU 510 realizes predetermined functions, for example, in cooperation with software.

The memory 520 is formed, for example, from a flash memory. The memory 520 stores a program 542 and data which are needed to realize the functions of the body pressure sensor 303. The memory 520 stores, for example, device IDs 541 which are the identification numbers of the multiple body pressure sensors 303 to 305.

The sensor controller 500 performs various arithmetic operations by reading the data and the program which are stored in the memory 520, and thereby realizes various functions. The sensor controller 500 performs, for example, a signal process based on the sensor signal from the body pressure detection circuit 501. The sensor controller 500, for example, defines a position on the seat of the chair using coordinates on two axes, that is to say, the X- and Y-axes. For example, the left-right and front-back directions relative to the user, as seated in the chair, may be defined as the X- and Y-axes, respectively. A range of detection of the body pressure by the body pressure sensor 303 installed in the seat can be defined using the coordinates. For example, the sensor controller 500 may be designed to detect a distribution of the body pressure within the detection range, or the position of the center of gravity of the user based on the distribution of the body pressure.

Otherwise, multiple body pressure sensors with small detection ranges than that of the above-described body pressure sensor may be installed as the body pressure sensors 303 in the seat to detect the body pressures at the positions where the multiple body pressure sensors 303 are installed. Otherwise, the position of the center of gravity of the user may be detected using values of the body pressures detected at the positions where the multiple body pressure sensors 303 are installed.

The position of the center of gravity of the user may be represented using the coordinates on the two axes, that is to say, the X- and Y-axes.

Furthermore, in a case where the body pressure sensor 303 performs the detection at predetermined time intervals, the sensor controller 500 is capable of detecting a change in the position of the center of gravity of the user. The sensor controller 500 may be designed, for example, to detect a change in the position of the center of gravity in the front-back direction relative to the user as seated in the chair.

The sensor controller 500 generates sensor data on a result of the detection of the body pressure by the body pressure sensor 303. The sensor controller 500 transmits the generated sensor data together with the device ID 541 of the body pressure sensor 303 to the local server 310 and the like via the communication circuit 502.

The sensor controller 500 may be a hardware circuit such as a dedicated electronic circuit designed to realize the predetermined functions or a reconfigurable electronic circuit. The sensor controller 500 may be made up from various semiconductor integrated circuits such as a CPU, an MPU, a microcomputer, a DSP, an FPGA, and an ASIC.

It should be noted that, as discussed above, the body pressure sensors 304, 305 each have the same configuration as the body pressure sensor 303. For this reason, detailed descriptions for the body pressure sensors 304, 305 are omitted herein.

[1-3. Configuration of Server]

Figure 5:
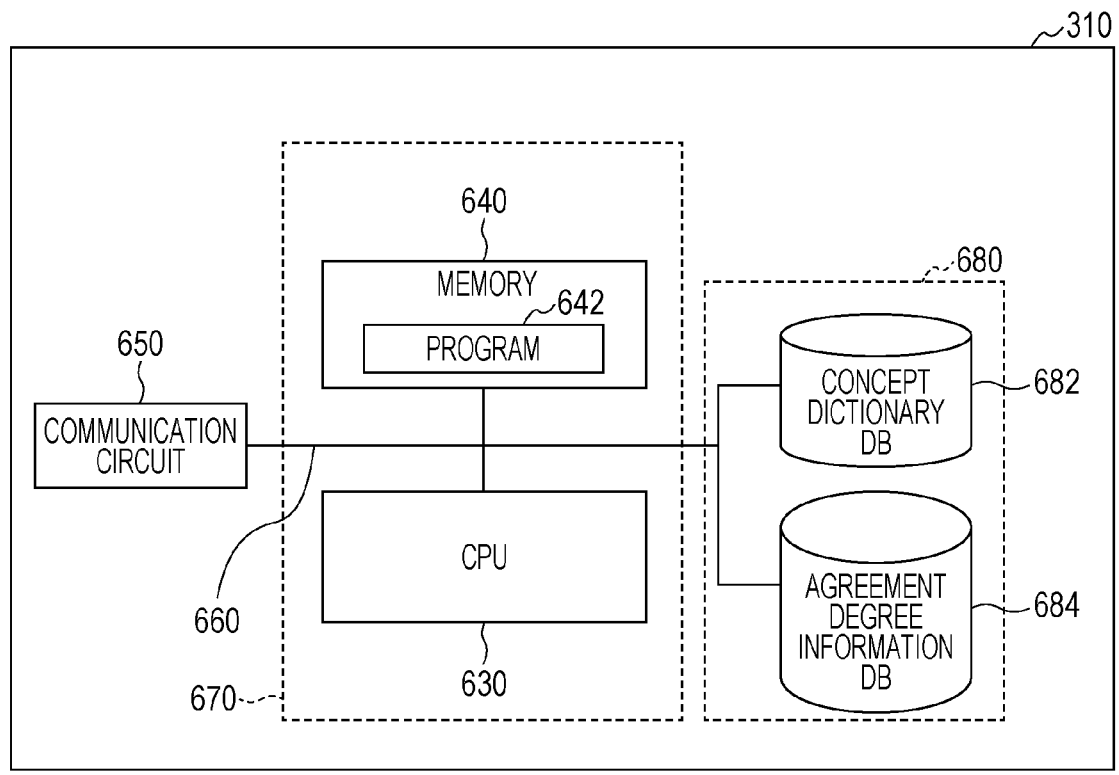
FIG. 5 is a diagram illustrating a configuration of a local server in the conference support system.
Figure 6:
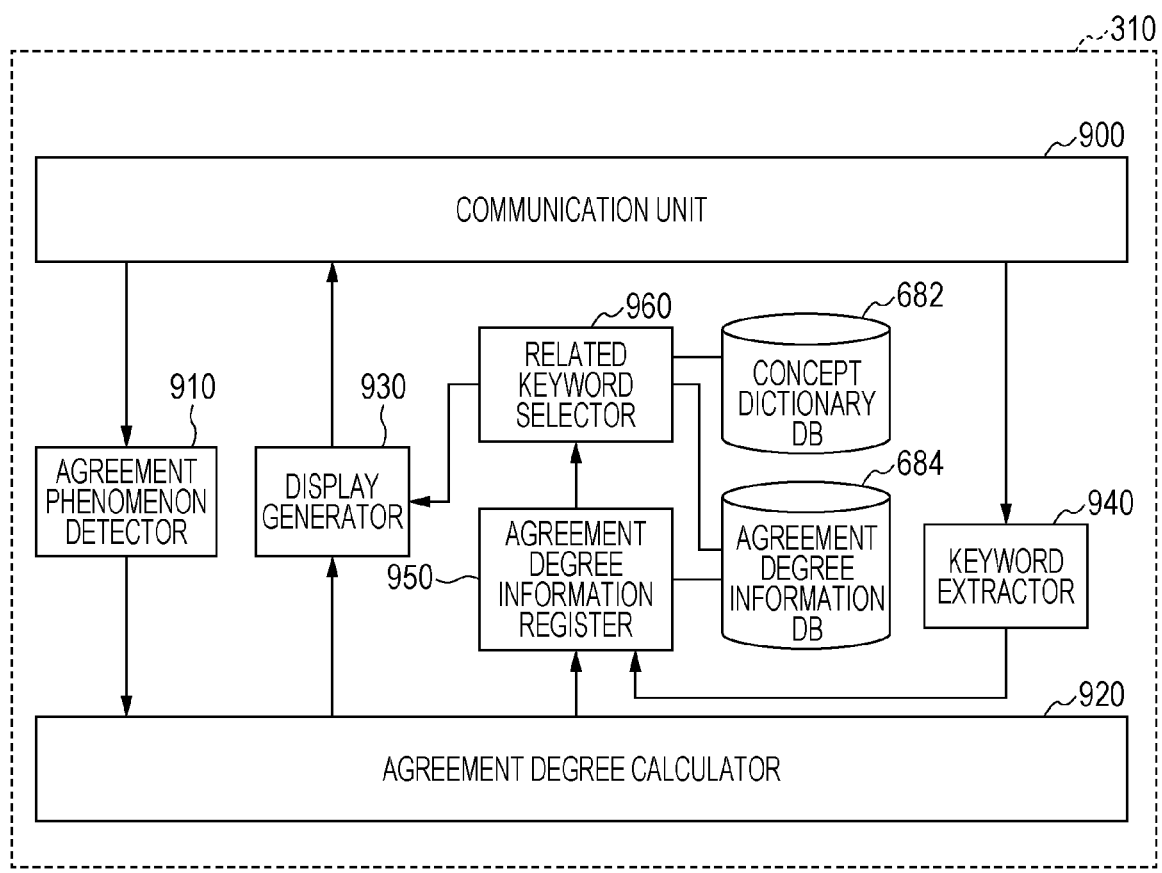
FIG. 6 is a functional block diagram illustrating functions of the local server in the conference support system.

The details of the configuration of the local server 310 in the system will be described referring to FIGS. 5 and 6. FIG. 5 is a diagram illustrating the configuration of the local server 310 in the system. FIG. 6 is a functional block diagram illustrating functions of the local server 310.

The local server 310 is formed, for example, from an information processing apparatus such as a personal computer (PC). As illustrated in FIG. 5, the local server 310 includes a communication circuit 650, a server controller 670, and a data storage unit 680. The server controller 670 includes a CPU 630, and a memory 640. In the local server 310, the communication circuit 650, the CPU 630, the memory 640, and the data storage unit 680 are connected together through a bus 660.

The communication circuit 650 is an interface circuit which communicates data in compliance with predetermined communication standards through a wireless or wired communication line. The predetermined communication standards include IEEE802.3, IEEE802.11a/11b/11g/11ac, IEEE1395, USB, HDMI, WiFi, and Bluetooth. The communication circuit 650 is an example of an acquisition unit which acquires the voice data generated by the microphones 300 to 302 and the sensor data generated by the body pressure sensors 303 to 305 through the data communication.

The server controller 670 controls the overall operation of the local server 310. In the server controller 670, the CPU 630 realizes predetermined functions, for example, in cooperation with software.

The memory 640 is formed, for example, from a flash memory, a static random access memory (SRAM), a dynamic random access memory (DRAM), or the like. The memory 640 is an example of a storage unit in the local server 310. The memory 640 stores a program 642 and data which are needed to realize the functions of the local server 310. The memory 640 temporarily stores (holds), for example, the voice data from the microphones 300 to 302 and the sensor data from the body pressure sensors 303 to 305. The memory 640 may function as a work area for the server controller 670.

The data storage unit 680 is formed, for example, from a hard disk drive (HDD), or a semiconductor storage device (SSD). The data storage unit 680 is an example of a storage unit in the local server 310. The data storage unit 680 stores, for example, a concept dictionary database 682 and an agreement degree information database 684 (each database will be hereinafter shortened to as a "DB"). The concept dictionary DB 682 is a database which manages multiple keywords and their superordinate concepts. The agreement degree information DB 684 is a database which associates and manages degrees of agreement among users, and keywords related to topics over which agreements arise. The concept dictionary DB 682 and the agreement degree information DB 684 will be described in detail later.

The server controller 670 performs various arithmetic operations by reading the data and the program 642 which are stored in the storage units such as the data storage unit 680 and the memory 640, and thereby realizes various functions. For example, upon receipt of the voice data or the sensor data together with the device ID 441 or 541 via the communication circuit 650, the server controller 670 identifies which of the microphones 300 to 302 and the body pressure sensors 303 to 305 is the source of the transmission, based on the device ID 441 or 541.

Furthermore, the server controller 670 executes the information process (the program 642) for realizing the conference support method according to the present disclosure. For example, as illustrated in FIG. 6, the server controller 670 realizes the functions respectively of an agreement phenomenon detector 910, an agreement degree calculator 920, a display generator 930, a keyword extractor 940, an agreement degree information register 950, and a related keyword selector 960. The functions of the respective units will be described later. Incidentally, in FIG. 6, a communication unit 900 exerts the same function as the communication circuit 650.

It should be noted that the server controller 670 may be a hardware circuit such as a dedicated electronic circuit designed to realize the predetermined functions or a reconfigurable electronic circuit. The server controller 670 may be made up from various semiconductor integrated circuits such as a CPU, an MPU, a microcomputer, a DSP, an FPGA, and an ASIC.

The foregoing descriptions have discussed one example of the information processing apparatus formed from the local server 310. The information processing apparatus according to the present disclosure is not limited to this one, and may have various apparatus configurations. For example, the information processing apparatus may be one or more server apparatuses such as ASP servers. For example, the information processing apparatus may perform the information process for realizing the conference support method by, via the communication circuit 650, obtaining various sensor data (including voice data) inputted through the Internet and the like. Furthermore, the information processing apparatus may transmit information (presentation information or agreement degree information) based on the above-discussed information process result to the display device 315 and the like through the Internet and the like. Moreover, the information process for realizing the conference support method according to the present disclosure may be performed using the computer cluster, the cloud computing or the like. The information processing apparatus may be administered by a service provider, a data center operating company, an apparatus maker, a management company or the like depending on the necessity.

[2. Operation]

Descriptions will be hereinbelow provided for how the conference support system for realizing the conference support method of the embodiment works.

[2-1. Overview of Operation]

Figure 7:
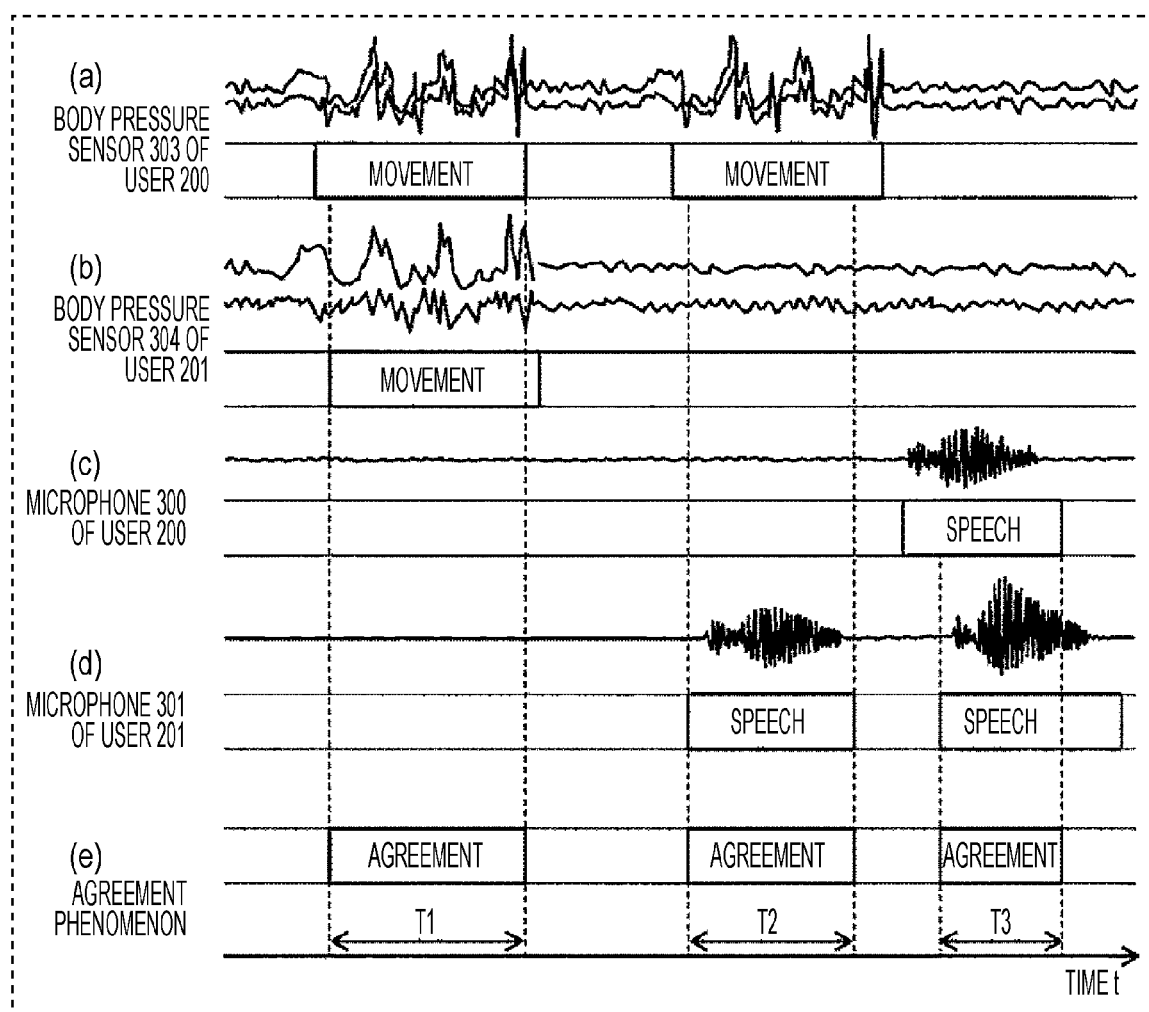
FIG. 7 is a diagram illustrating an example of how the conference support system detects an agreement phenomenon.

Referring to FIG. 7, descriptions will be provided for the overview of how the conference support system of the embodiment works. FIG. 7 is a diagram illustrating an example of how the system detects an agreement phenomenon.

FIGS. 7(a) and 7(b) illustrate examples of sensor data generated by the body pressure sensors 303, 304 of the users 200, 201, respectively. FIGS. 7(c) and 7d illustrate examples of voice data generated by the microphones 300, 301 of the users 200, 201, respectively. FIG. 7(e) illustrates examples of a timing at which an agreement phenomenon is detected based on the various sensor data (including the voice data) illustrated in FIGS. 7(a) to 7(d).

In the system, the microphones 300 to 302 and the body pressure sensors 303 to 305 of the users 200 to 202 detects the voices and body pressures of the users 200 to 202 at any time during the conference, and thereby generate various sensor data on the detection results, as illustrated in FIGS. 7(a) to 7(d). The detection results respectively outputted from the microphone 300 and the body pressure sensor 303 are referred to as condition information on the condition of the user 200 as well. The detection results respectively outputted from the microphone 301 and the body pressure sensor 304 are referred to as condition information on the condition of the user 201 as well. The detection results respectively outputted from the microphone 302 and the body pressure sensor 305 are referred to as condition information on the condition of the user 202 as well.

In an example illustrated in FIG. 7, in time period T1, motions of the users 200, 201 are simultaneously detected as conditions of the two users 200, 201 (FIGS. 7(a) and 7(b)). In such a case, for example, a possible situation may be where both users act like spontaneously trace each other's actions by giving responding gestures or nods. In addition, in time period T2, motions of the user 200 and utterance of the user 201 are simultaneously detected as conditions of the two users 200, 201 (FIGS. 7(a) and 7(d)). In time period T3, utterance of the two users 200, 201 is simultaneously detected as conditions of the users 200, 201 (FIGS. 7(c) and 7(d)). For example, a possible situation may be where one of the two users 200, 201 gives responding gestures, nods, exclamations or reactions to the other user.

One may consider that a phenomenon in which utterance and/or body movements occur from the users 200, 201 like in time periods T1, T2, T3 shows that the users agree to each other. From this viewpoint, in this embodiment, the local server 310 performs the information process based on the various sensor data generated by the microphones 300 to 302 and the body pressure sensors 303 to 305, and thereby detects an agreement phenomenon in which the users agree to each other.

In addition, it can be assumed that during an actual conference, the discussion becomes active and lively from time to time because all the users participating in the conference agree to each other or because some of them agree to each other. With this taken into consideration, in the embodiment, for each of groups including all the users or some users (user sets), a degree of agreement (agreement degree) is calculated, and it is identified which user set there is agreement among. A user set is one of multiple subsets contained in the universal set which is a set including all the users participating in the conference as elements. The multiple subsets contained in the universal set are all subsets which include at least two of the elements included in the universal set.

For example, in a case where three users 200, 201, 202 are the participants in the conference, the multiple user sets are four subsets: a subset including two users 200, 201 as elements; a subset including two users 200, 202 as elements; a subset including two uses 201, 202 as elements; and the universal set including the three users 200, 201, 202 as elements. Incidentally, the universal set is among the above-mentioned subsets.

It should be noted that although the number of subsets contained in the above universal set is four in the case where three users 200, 201, 202 are the participants in the conference, the number of subsets contained in the universal set, that is to say, the number of user sets becomes larger as the number of participants in the conference increases.

In the case where the number of users participating in the conference is three, the agreement degree is calculated for each of the above four user sets.

Thereafter, a subset corresponding to a user set whose agreement degree is the highest among the four calculated agreement degrees is identified. The identified subset means that users corresponding to the elements included in the subset agree most to each other. Thereby, various information presentations can be carried out depending on factors such as how active and lively the discussion becomes from time to time during the conference. Detailed descriptions will be hereinbelow provided for how the system works.

[2-2. Overall Operation of Local Server]

Referring to FIGS. 6 and 7, descriptions will be provided for overall operation of the local server 310 in the system.

In the system, the local server 310 obtains the sensor data on the detection results from the microphones 300 to 302 and the body pressure sensors 303 to 305 of the users 200 to 202 via the communication unit 900 at any time. The obtained sensor data are information on conditions of the users, and therefore are referred to as condition information as well. The local server 310 holds the obtained various sensor data in the memory 640 and the like one after another. In the same time, the local server 310 may calculate possible combinations including at least two of the users 200 to 202, and hold the calculated combinations in the memory 640 and the like as the user sets.

First of all, the server controller 670 in the local server 310 functions as the agreement phenomenon detector 910, and based on the held sensor data, detects an agreement phenomenon among the users. The agreement phenomenon detection process is performed repeatedly at a predetermined cycle, for example at every one second, by doing things such as using sensor data held for past 5 seconds. The agreement phenomenon detection process will be described later.

When detecting an agreement phenomenon, the server controller 670 functions as the agreement degree calculator 920, and calculates an agreement degree for each of the user sets. The user sets are groups including some or all of the users 200 to 202. An agreement degree represents a degree at which users included in a user set agree to one another. The agreement degree calculation process will be described later.

Based on the agreement degree calculation results, the server controller 670 identifies a user set with the highest agreement degree, for example. The server controller 670 functions as the display generator 930, and causes the display device 315 to display presentation information in order to present the identified user set, the calculated agreement degree, and the like to the users 200 to 202 and the like.

Furthermore, the server controller 670 functions as the keyword extractor 940, the agreement degree information register 950, the related keyword selector 960 and the display generator 930 to perform a related information display process. The related information display process is a process of, depending on a user set among which there is agreement, causing the display device 315 to display the presentation information (related information) on a topic over which the agreement arises. The related information display process will be described in detail later.

The above-discussed operation of the local server 310 makes it possible to support the conference of the user 200 to 202 by: based on various sensor data, detecting agreement phenomena and calculating agreement degrees; and thereby obtaining information useful to grasp the conference condition. Descriptions will be hereinbelow provided for the various processes to be performed by the local server 310.

[2-3. Agreement Phenomenon Detection Process]

Figure 8:
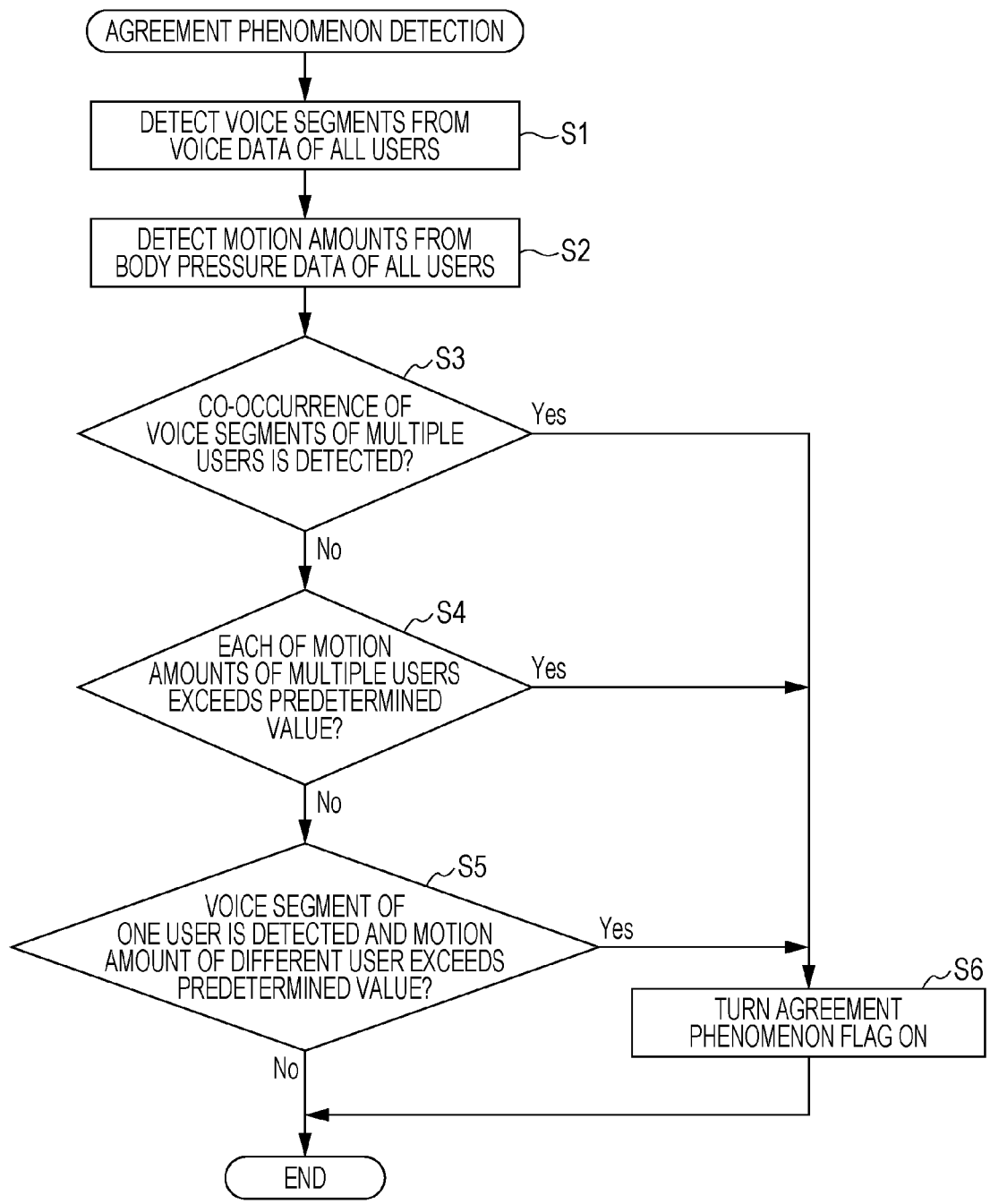
FIG. 8 is a flowchart illustrating an agreement phenomenon detection process to be performed by the local server.

Using FIG. 8, descriptions will be provided for details of the agreement phenomenon detection process to be performed by the local server 310.

The process in FIG. 8 is performed by the server controller 670 functioning as the agreement phenomenon detector 910.

The process according to the flowchart in FIG. 8 is started after various sensor data held in the memory 640 become more than received from the microphones 300 to 302 and the body pressure sensors 303 to 305 (see FIG. 2) of all the users 200 to 202 within one detection period. The detection period is a period for agreement phenomenon detection, and is set at past 5 seconds or the like, for example. The process according to the flowchart is repeatedly performed at a predetermine cycle (at every one second, for example).

To begin with, based on the voice data from the microphones 300 to 302 of all the users 200 to 202, for each of the users 200 to 202, the server controller 670 detects voice segments within the detection period (S1). A voice segment is a time segment in which a voice is produced through utterance and the like.

Furthermore, based on the sensor data from the body pressure sensors 303 to 305 of all the users 200 to 202, for each of the users 200 to 202, the server controller 670 detects an amount of motion within the detection period (S2). Incidentally, the sequence of the processes in steps S1 and S2 is not specifically limited. For example, the processes in steps S1 and S2 may be performed in parallel.

Next, based on results of the voice segment detection, the server controller 670 determines whether co-occurrence of voice segments of multiple users is detected within the detection period (S3). For example, in the case illustrated in FIG. 7, time period T3 is detected as including voice segments of two users 200, 201 (FIGS. 7(c) and 7(d)), and the sever controller 670 proceeds from step S3 to "Yes." Meanwhile, time period T2 is detected as including a voice segment of a user 201 (FIG. 7(d)), and the server controller 670 proceeds from step S3 to "No."

If the server controller 670 determines that the co-occurrence of voice segments of multiple users is detected (Yes in step S3), the server controller 670 activates an agreement phenomenon flag so that the flag is "ON" (S6). The agreement phenomenon flag is a flag to indicate whether an agreement phenomenon is detected, and the memory 640 in advance stores the flag as being "OFF," for example. In the embodiment, the "ON" state of the agreement phenomenon flag indicates that an agreement phenomenon is detected, whereas the "OFF" state of the agreement phenomenon flag indicates that no agreement phenomenon is detected.

On the other hand, if the server controller 670 determines that the co-occurrence of the voice segments of multiple users is not detected (No in step S3), the server controller 670 determines whether an amount of motion of each of the users exceeds a predetermined threshold value within the detection period (S4). The threshold value is a reference for detecting a motion of a user showing agreement, and is set, for example, with an amount of motion accompanying responding gestures, nods and the like taken into consideration.

For example, in the case illustrated in FIG. 7, in time period T1, the amounts of motions of two users 200, 201 exceed the threshold value (FIGS. 7(a) and 7(b)). Thus, the server controller 670 proceeds from step S4 to "Yes." On the other hand, in time period T2, only the amount of motion of one user 200 is detected (FIG. 7(a)). Thus, the server controller 670 proceeds from step S4 to "No."

If the server controller 670 determines that the amounts of motions of multiple users exceed the threshold value (Yes in step S4), the server controller 670 turns the agreement phenomenon flag "ON" (S6).

On the other hand, if the server controller 670 determines that the amounts of motions of at least two users do not exceed the threshold value (No in step S4), the server controller 670 determines whether, within the detection period, a voice segment of any one user is detected and the amount of motion of a user different from the user with the detected voice segment exceeds the threshold value (S5). For example, in the case illustrated in FIG. 7, in time period T2, a voice segment of one user 200 is detected, and the amount of motion of a different user 201 is detected (FIGS. 7(a) and 7(d)). Thus, the server controller 670 proceeds from step S5 to "Yes."

If the server controller 670 determines that a voice segment of one user is detected and the amount of motion of a different user exceeds the threshold value (Yes in step S5), the server controller 670 turns the agreement phenomenon flag "ON" (step S6). The server controller 670 ends the process according to the flowchart by turning the agreement phenomenon flag "ON" in step S6.

On the other hand, if the server controller 670 determines that a voice segment of one user is detected but the amount of motion of any other user does not exceed the threshold value (No in step S5), the server controller 670 ends the process according to the flowchart without performing the process of step S6. If in step S5, within the detection period, nobody's voice segment is detected, nobody's motion amount exceeds the threshold value, or a voice segment of only one user is detected while only the amount of motion of the same user exceeds the threshold value, the server controller 670 proceeds to "No."

The above-discussed process makes it possible to, in real time, detect whether an agreement phenomenon arises among the users 200 to 202, based on sensor data detected by the various sensor devices 300 to 305 at any time during a conference or the like of detection interest.

The sequence of the steps in the above-discussed process is not specifically limited, and depending on the necessity, may be changed from what has been discussed. For example, the sequence of the processes in steps S3, S4, S5 may be changed depending on the necessity. Furthermore, in each of steps S3, S4, S5, the server controller 670 may determine if there is a voice segment(s) or an amount of motion(s) detected from at least one user or at least two users.

[2-4. Agreement Degree Calculation Process]

Figure 9:
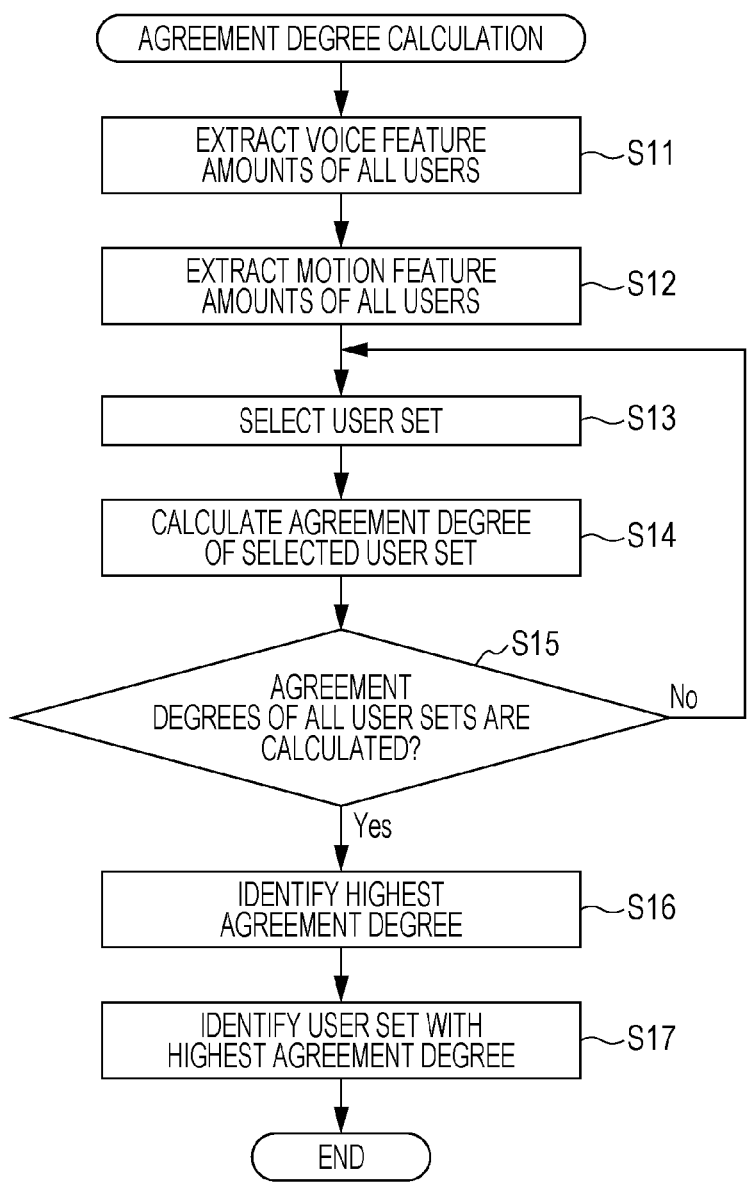
FIG. 9 is a flowchart illustrating an agreement degree calculation process to be performed by the local server.

Using FIG. 9, descriptions will be provided for the details of the agreement degree calculation process to be performed by the local server 310. FIG. 9 is a flowchart illustrating the agreement degree calculation process.

The process according to the flowchart is started, for example, when the agreement phenomenon flag is turned "ON" in the agreement phenomenon detection process (see step S6 in FIG. 8). The process according to the flowchart is performed by the server controller 670 functioning as the agreement degree calculator 920.

To begin with, the server controller 670 extracts voice feature amounts of the respective users 200 to 202, for example, from voice data from the microphones 300 to 302 within the agreement degree detection period (S11). A voice feature amount is a feature amount representing the duration of a time segment of a user's utterance (utterance segment), for example. The voice feature amount may be a feature amount based on a voice volume, a voice frequency or the like during utterance.

Furthermore, the server controller 670 extracts motion feature amounts of the respective users 200 to 202, for example, from sensor data from the body pressure sensors 303 to 305 within the detection period (S12). A motion feature amount is a feature amount representing a user's predetermined motions such as forward leaning, nod and responding gesture based on the position of the center of gravity or the like of the user.

Next, the server controller 670 selects a user set including some or all of the users 200 to 202 (S13). For example, a set including all the users as elements is referred to as the universal set. In this case, the server controller 670 identifies all subsets which are contained in the universal set, and which each include at least two of the elements included in the universal set.

In a case where the total number of users is three or more, there are multiple subsets. The multiple identified subsets are referred to as multiple user sets as well.

For example, in a case where the total number of users is three, there are four subsets contained in the universal set and each including at least two of the elements included in the universal set: a subset including two users 200, 201 as elements; a subset including two users 200, 202 as elements; a subset including two users 201, 202 as elements; and the universal set including all the three users 200, 201, 202 as elements. Incidentally, the universal set is among the above-mentioned subsets.

For this reason, in the case where the total number of users is three, the total number of subsets contained in the universal set and each including at least two of the elements included in the universal set, that is to say, the total number of user sets is four.

The server controller 670 selects, for example, one of the above-discussed multiple user sets. The multiple user sets are all multiple subsets which are contained in the universal set, and which each include at least two of the elements included in the universal set. Information on each of the subsets corresponding respectively to the multiple user sets is stored in the memory 640 in advance, for example.

Subsequently, with regard to the selected user set, the server controller 670 calculates an agreement degree representing a degree at which the users included in the user set agree to each other (S14). The server controller 670 calculates the agreement degree, for example, by performing an arithmetic operation based on Equation (1) given below:

$$S = \frac{1}{N}\left[C_m \sum_{i=1}^{N}(y^i_{max} - y^i_{min}) + C_v \sum_{i=1}^{N}\frac{v^i}{T}\right] \quad (1)$$

where: S is the agreement degree; N is the number of users included in the selected user set; T is the duration of the detection period; $C_m$ and $C_v$ are coefficients representing predetermined weights; $v^i$ is a duration of utterance segment of an i-th user in the selected user set; and $$y_{max}^{i} = \max[w_i(t)] \quad (2)$$

$$y_{min}^{i} = \min[w_i(t)] \quad (3)$$

where: max[ ] and min [ ] are a maximum value and a minimum value in the detection period T; and with $w_i(t)$ is a y-coordinate of the center of gravity of the i-th user at time t, and a standardized value at 0 to 1, for example. In this respect, the y-coordinate is, for example, a coordinate on the seat of the chair 204 (see FIG. 1) in the front-back direction with the backrest assumed to be located at the back of the chair 204.

According to Equations (2) and (3), $y_{max}^{i}$ and $y_{min}^{i}$ in Equation (1) represent a maximum value and a minimum value of the y-coordinate of the center of gravity of the i-th user, and are associated with the forward and backward leaning motions of the user as seated in the chair 204. According to Equation (1), the agreement degree S of a user in the selected user set is calculated such that the agreement degree S becomes higher as the user gives longer utterance ($v^i$) and leans forward with a larger swing ($y_{max}^{i}$, $y_{min}^{i}$) within the detection period T.

Next, the server controller 670 determines whether the agreement degrees of all the user sets have been calculated (S15). If the agreement degrees of all the user sets have not been calculated yet (NO in step S15), the server controller 670 returns to step S13, where the server controller 670 selects an unselected user set. The server controller 670 calculates the agreement degrees of all the user sets by repeatedly performing the processes in and after step S13. The agreement degrees calculated for the respective user sets are temporarily stored in the memory 640 or the like.

After calculating the agreement degrees of all the user sets (Yes in step S15), the server controller 670 identifies the highest agreement degree which is the highest among the calculated agreement degrees (S16).

Thereafter, the server controller 670 identifies a user set with the highest agreement degree (S17). After performing the process of step S17, the server controller 670 ends the process according to the flowchart, for example, with turning the agreement phenomenon flag (see FIG. 8) "OFF."

When an agreement phenomenon is detected, the above-discussed process makes it possible to calculate the agreement degree of each of the user sets expected in advance, and to identify a user set among which there is expected to be agreement.

In the above-discussed process, the arithmetic expressions to be used for the agreement degree calculation are not necessarily limited to Equations (1) and (2). Various arithmetic expressions may be used for the agreement degree calculation. Examples of usable arithmetic expressions include: arithmetic expressions for evaluating overlap between/among periods for which sensor data are at a predetermined or higher level; arithmetic expressions for evaluating frequencies of responding gestures and nods; and arithmetic expressions for evaluating how active and lively discussion becomes using the voice pitch, volume, etc. during utterance.

Although the foregoing descriptions have discussed an example where the period in which the above process is applied to sensor data is the agreement degree detection period, the period in which the above process is applied is not limited to this. For example, a period in which an agreement phenomenon arises may be extracted from the detection period, and used as the period in which the process is applied.

Furthermore, although the foregoing descriptions have discussed an example where based on the agreement phenomenon detection result, an agreement degree is calculated for each of the user sets including some or all of the users, the agreement degree calculation process is not limited to this example. For example, the agreement degree calculation process may be such that: an agreement degree is always calculated for each of all the user sets; and a period in which an agreement degree of a certain user set exceeds a specific threshold value is used as a period in which an agreement phenomenon arises. This makes it possible to eliminate the agreement phenomenon detection process (FIG. 8), which is followed by the agreement degree calculation process.

[2-5. Display Operation]

Based on the calculation result from the foregoing agreement degree calculation process, the server controller 670 in the local server 310 functions as the display generator 930 to generate various presentation information, and causes the display device 315 to display the presentation information.

Using FIGS. 10A, 10B, 11, 12, descriptions will be provided for examples of the presentation information.

FIGS. 10A and 10B illustrate first display examples of the presentation information to be displayed by the display device 315 at first and second times. The local server 310 causes the display device 315 to display the presentation information on the agreement degree calculation result, for example, in real time during the conference. A "Group Name" list of user sets and an "Agreement Degree" list of calculation results are displayed in the display examples illustrated in FIGS. 10A and 10B. Furthermore, in the display examples, as an instance, the highest agreement degree, and the group name of a user set with the highest agreement degree are highlighted. Incidentally, although both the "Group Name" list of the user sets and the "Agreement Degree" list of the calculation results are displayed in the display examples illustrated in FIGS. 10A and 10B, at least one of the "Group Name" list of the user sets and the "Agreement Degree" list of the calculation results may be displayed.

In FIG. 10A, the agreement degree calculation results at the first time are displayed. In FIG. 10B, the agreement degree calculation results at the second time later than the first time are displayed. For example, each time the server controller 670 calculates the agreement degrees in the agreement degree calculation process (FIG. 9), the server controller 670 updates the agreement degrees to be displayed by the display device 315. This makes it possible to present the presentation information on the agreement degrees to the users 200 to 202 in real time during the conference.

Figure 11:
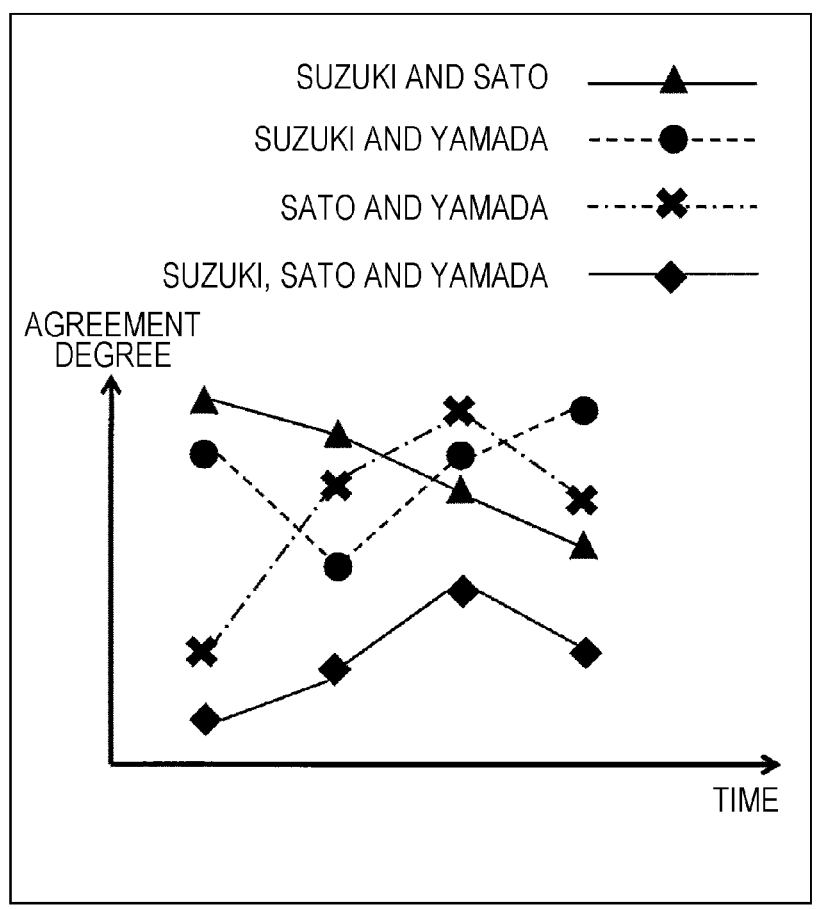
FIG. 11 is a diagram illustrating a second display example of the presentation information in Embodiment 1.

FIG. 11 illustrates a second display example of the presentation information to be displayed by the display device 315. In the display example, for each user set, a graph on which an agreement degree is plotted at each time is displayed. The display like in this example may be performed with real time update during the conference, or collectively after the conference. For example, the server controller 670 accumulates agreement degrees calculated for the respective user sets into the memory 640 or the like at each time, and based on a user's instruction or like, causes the display device 315 to display the presentation information like in the example illustrated in FIG. 11. The presentation information like this makes it possible to check changes in the agreement degrees over time during the conference, and thereby to provide conference support.

Figure 12:
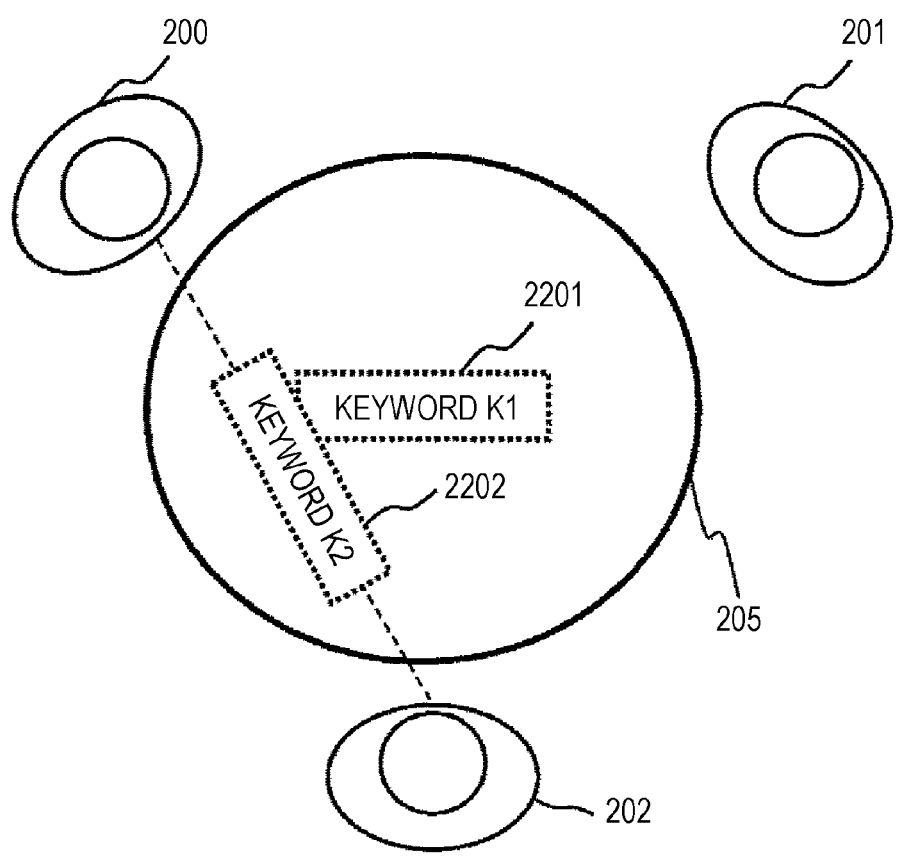
FIG. 12 is a diagram illustrating a third display example of the presentation information in Embodiment 1.

FIG. 12 illustrates a third display example of the presentation information to be displayed by the display device 315. In the embodiment, in addition to or instead of the foregoing presentation information on agreement degree calculation results, depending on a user set identified as sharing agreement, the display device 315 displays related information (another example of the presentation information) related to a topic over which the agreement arises among the user set.

FIG. 12 illustrates: related information 2201 displayed in a case where agreement arises among a user set of three users 200, 201, 202; and related information 2202 displayed in a case where agreement arises among a user set of two users 200, 202 shares agreement. The related information 2201 includes a related keyword K1, and the related information 2202 includes a related keyword K2. The related keywords K1, K2 each are a keyword related to a topic over which agreement arises among the user set, such as belonging to a genre which cover the topic about which the user set shares the agreement. The displaying of the related information 2201, 2202 including the related keywords K1, K2 makes it possible to assist in developing ideas during the conference. Incidentally, the related information includes words or phrases which are uttered by multiple users during a discussion.

Furthermore, as illustrated in FIG. 12, depending on where the chairs are in each user set, the embodiment changes positions where to display the related information 2201, 2202. For example, the related information 2201 in connection with the three users 200, 201, 202 is displayed near the center position of the round table 205, depending on the chairs of the three users sitting around the table 205. Meanwhile, the related information 2202 in connection with the two users 200, 202 is displayed near the center of a straight line joining the chairs of the two users. This makes it possible for each user in a user set of interest to easily see the related information. Descriptions will be hereinbelow for a process (related information display process) to be performed by the local server 310 in order to display related information as discussed above.

[2-6. Related Information Display Process]

Figure 13:
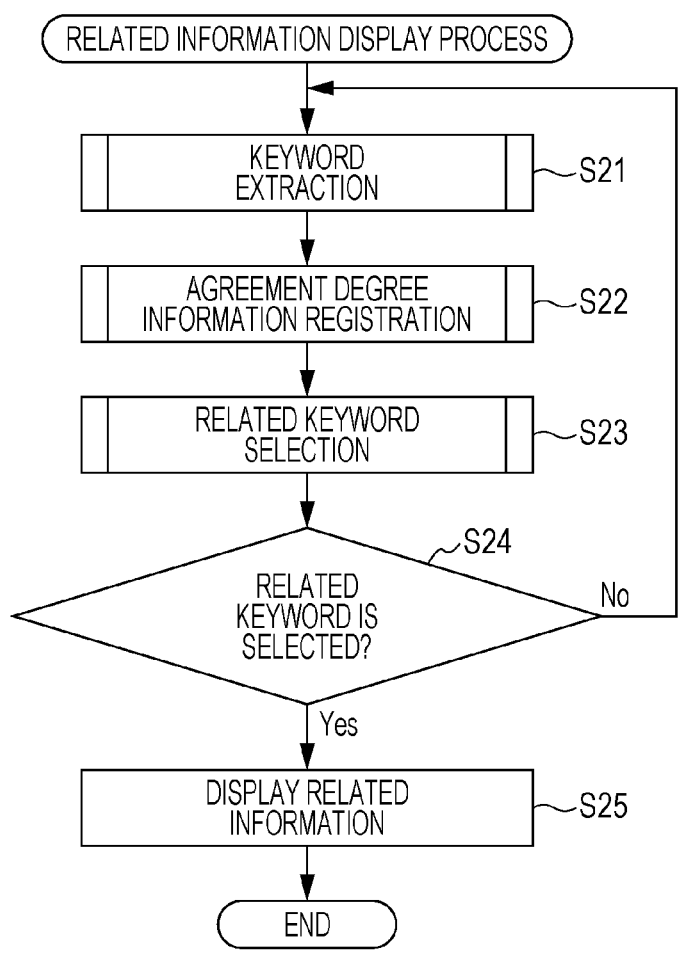
FIG. 13 is a flowchart illustrating a related information display process to be performed by the local server.

Referring to FIG. 13, descriptions will be provided for the related information display process in the embodiment. FIG. 13 is a flowchart illustrating the related information display process to be performed by the local server 310.

The process according to the flowchart is started, for example, after performing the agreement degree calculation process (FIG. 9). The process according to the flowchart is performed by the server controller 670.

To begin with, the server controller 670 functions as the keyword extractor 940 (FIG. 6), and extracts a keyword related to a topic over which an agreement phenomenon arises (S21). When the server controller 670 detects an agreement phenomenon, the server controller 670 extracts a keyword from voice data obtained by the microphones 300 to 302, for example, using a keyword spotting method. Descriptions will be provided later for the details of a keyword extraction process.

Next, the server controller 670 functions as the agreement degree information register 950 (FIG. 6), and registers agreement degree information into the agreement degree information DB 684 (S22). The agreement degree information is information on an agreement degree which changes every moment during a conference, and includes, for example, the highest agreement degree, a user set with the highest agreement degree, and an extracted keyword. Descriptions will be provided later for the details of an agreement degree information registration process.

Next, the server controller 670 functions as the related keyword selector 960 (FIG. 6), and selects a related keyword which is related to the extracted keyword (S23). This process is performed using the concept dictionary DB 682. The concept dictionary DB 682 will be described using FIG. 14.

Figures 14, 15:
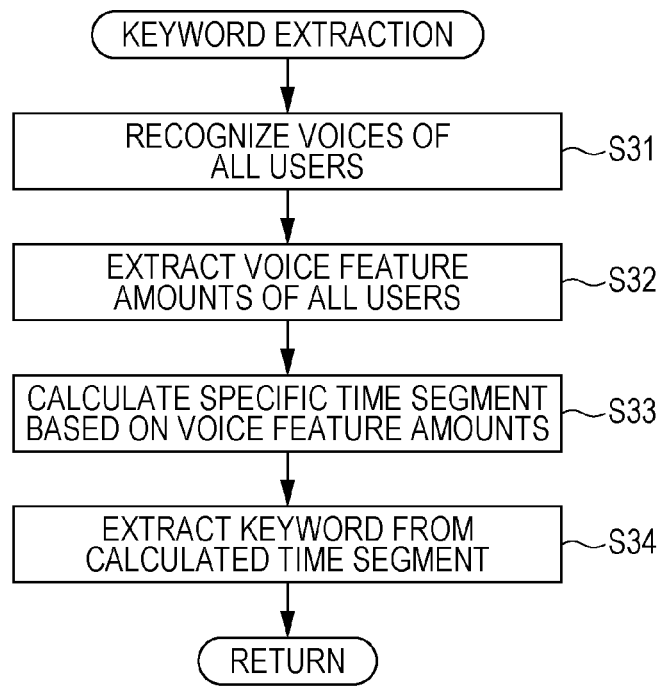
FIG. 14 is a diagram illustrating an example of a concept dictionary database in the local server.
FIG. 15 is a flowchart illustrating a keyword extraction process to be performed in the related information display process.

FIG. 14 is a diagram illustrating an example of the concept dictionary DB 682 in the local server. As illustrated in FIG. 14, the concept dictionary DB 682 associates a "keyword" and a "superordinate concept" to each other. The "superordinate concept" is, for example, a concept which covers multiple keywords. In the concept dictionary DB 682 whose example is illustrated in FIG. 14, multiple keywords such as "baseball," "tennis," "soccer" and "sumo wrestling" are associated with a superordinate concept "sport" corresponding to these genres. Furthermore, with regard to other superordinate concepts "movie" and "novel," keywords (Movie A, Movie B, Novel C) belonging to these superordinate concepts are registered in the concept dictionary DB 682.

Returning to FIG. 13, in a related keyword selection process in step S23, as a related keyword, a keyword which is associated with the superordinate concept covering the extracted keyword is selected from the concept dictionary DB 682. Descriptions will be provided later for the details of the related keyword selection process.

Thereafter, the server controller 670 determines whether a related keyword is selected (S24). If the server controller 670 determines that a related keyword is selected (Yes in step S24), the server controller 670 causes the display device 315 to display related information on the related keyword (S25). At the same time, based on a user set included in the agreement degree information, the server controller 670 sets a position in which to display the related information near, etc. the midpoint between or among the seating positions of the respective users in the user set.

The server controller 670 ends the process according to the flowchart with causing the display device 315 to display the related information (S25). On the other hand, if no related keyword is selected (No in step S24), the server controller 670 ends the process without causing the display device 315 to display the related information.

When an agreement phenomenon is detected, the foregoing process makes it possible to extract the keyword representing the topic among the user set with the highest agreement degree, and to present the related information using the related keyword related to the extracted keyword.

In the foregoing process, after the keyword related to the topic over which the agreement arises is extracted, whether or not the related keyword is detected is determined (S24). For this reason, as soon as the superordinate concept of the extracted keyword is identified, the related information can be displayed (S25).

The timing of displaying the related information is not limited to the above-mentioned one. For example, the related information may be displayed at a timing when the server controller 670 detects a silent segment in which silence with no voice data coming from the microphones 300 to 302 lasts longer than a predetermined length of time after the superordinate concept of the extracted keyword is identified (Yes in step S24). Otherwise, the related information may be displayed at set time or at a timing earlier than the set time by a predetermined length of time by setting a predetermined time such as a scheduled conference closing time in the memory 640 and the like.

[2-6-1. Keyword Extraction Process]

Using FIG. 15, descriptions will be provided for the keyword extraction process in step S21 in the related information display process (FIG. 13). FIG. 15 is a flowchart illustrating the keyword extraction process (step S21).

The flowchart in FIG. 15 is started, for example, after the agreement degree calculation process (FIG. 9). The process according to the flowchart is performed by the server controller 670 as functioning as the keyword extractor 940.

To begin with, for example, based on the voice data generated by the microphones 300 to 302 during the detection period in the agreement phenomenon detection process (FIG. 8), the server controller 670 performs a speech recognition process to identify the speeches of the respective users (S31).

Furthermore, the server controller 670 extracts the voice feature amounts of all the users 200 to 202 from the voice data during the detection period for the speech recognition (S32). A voice feature amount to be extracted in step S32 is, for example, a feature amount representing how active and lively a discussion becomes among the users, and based on a voice volume, a voice frequency or the like during a user's utterance.

Subsequently, based on the extracted voice feature amounts, the server controller 670 calculates a specific time segment of the detection period in which the keyword related to the topic corresponding to the agreement phenomenon is estimated to have occurred (S33). The server controller 670 performs this step, for example, by: calculating the probabilities of keyword occurrences based on the extracted voice feature amounts at each time; and determining a time segment whose calculated probability is equal to or higher than a predetermined value.

Thereafter, based on a speech recognition result covering the calculated specific time segment, the server controller 670 extracts a keyword which occurred in the time segment (S34). For example, with regard to the voice data on some or all of the users included in the user set with the highest agreement degree, the server controller 670 generates text data by speech recognition covering the specific time segment, and extracts a keyword.

The server controller 670 ends the process according to the flowchart with the keyword extraction in step S34. Thereafter, the server controller 670 proceeds to step S22 in the flowchart in FIG. 13.

The foregoing process makes it possible to obtain a keyword corresponding to a topic about which the users talk, such as an item to be discussed when an agreement phenomenon is detected.

The sequence of the steps in the foregoing process is not specifically limited, and may be changed from what has been discussed above, depending on the necessity. For example, the process of step S31 and the process of step S32 may be performed in parallel.

Furthermore, for example, the voice feature amount extracted in step S11 in the agreement degree calculation process (FIG. 9) may be used as the voice feature amount to be extracted in step S32. In this case, the process of step S32 may be eliminated.

Moreover, while extracting a keyword in step S34, the server controller 670, for example, may delete part of the generated text data which is considered as having no connection with the keyword, or extract part of the generated text as a keyword, based on the voice feature amount and the speech recognition result.

Furthermore, although the foregoing descriptions have discussed an example where the period in which to perform the keyword extraction process is the same as the detection period in the agreement phenomenon detection process (FIG. 8), the period in which to perform the process is not limited to this, and may be set to a particular past time period following the performing of the process. The particular past time period may be inclusive of and longer than the detection period.

[2-6-2. Agreement Degree Information Registration Process]

Figures 16, 17:
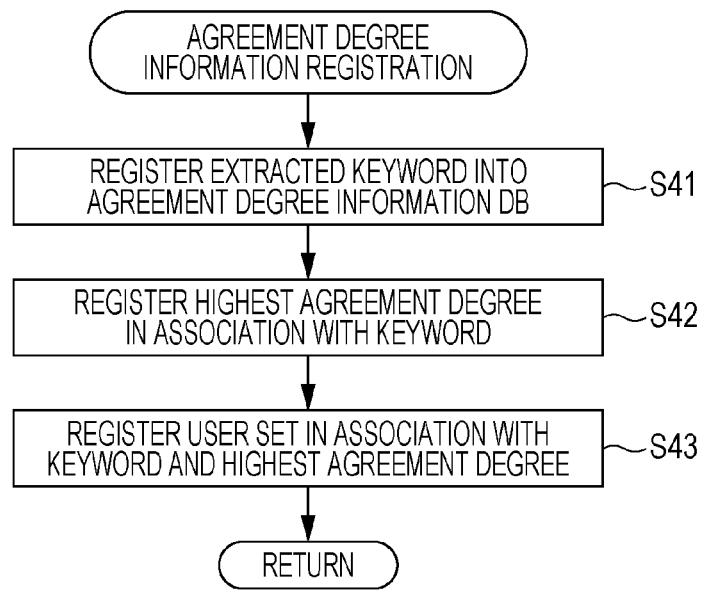
FIG. 16 is a flowchart illustrating an agreement degree information registration process to be performed in the related information display process.
FIG. 17 is a diagram illustrating an example of an agreement degree information database in Embodiment 1.

Using FIGS. 16 and 17, descriptions will be provided for the agreement degree information registration process in step S22 in the related information display process (FIG. 13). FIG. 16 is a flowchart illustrating the agreement degree information registration process (S22).

The process according to the flowchart in FIG. 16 is performed by the server controller 670, as functioning as the agreement degree information register 950, by using the agreement degree information DB 684. The agreement degree information DB 684 will be described using FIG. 17.

FIG. 17 illustrates an example of the agreement degree information DB 684. The agreement degree information DB 684 whose example is illustrated in FIG. 17 associates and manages an "information name," a "keyword," a "user set" and a "highest agreement degree." The "information name" is a name for identifying agreement degree information. For example, when the server controller 670 starts the process, the server controller 670 generates a new information name to be registered. For each information name, information registered in the past is stored in the agreement degree information DB 684.

Descriptions will be hereinbelow provided for an example where when an agreement phenomenon is detected in the agreement phenomenon detection process, the highest agreement degree "0.7" is calculated for a user set "Yamada and Suzuki" in the agreement degree calculation process (FIG. 9), and a keyword "baseball" is extracted in the keyword extraction process (FIG. 15).

In the flowchart in FIG. 16, to begin with, the server controller 670 registers the extracted keyword into the agreement degree information DB 684 (S41). In the example in FIG. 17, the server controller 670, for example, generates a new information name "Idea 4," and registers a keyword "baseball" in association with the information name "Idea 4."

Thereafter, the server controller 670 registers the highest agreement degree calculated in the agreement degree calculation process (FIG. 9) into the agreement degree information DB 684 in association with the registered keyword (S42).

Furthermore, the server controller 670 registers the user set for which to calculate the highest agreement degree in the agreement degree calculation process into the agreement degree information DB 684 in association with the registered keyword (S43).

In the example illustrated in FIG. 17, the server controller 670 registers the user set "Yamada and Suzuki," and the highest agreement degree "0.7" in association with the keyword "baseball" (S42, S43).

The server controller 670 ends the process according to the flowchart with registering the various information including the thus-extracted keyword into the agreement degree information DB 684. After that, the server controller 670 proceeds to step S23 in the flowchart in FIG. 13.

The foregoing process makes it possible to, each time a keyword is extracted, accumulate the corresponding agreement degree information into the agreement degree information DB 684. The reference to the agreement degree information DB 684 makes it possible to obtain a keyword related to a topic over which agreement arose among a specific user set in the past.

The sequence of steps S41, S42, S43 in the foregoing process is not specifically limited, and may be changed from what has been discussed above.

Moreover, the agreement degree information to be registered in the agreement degree information DB 684 is not limited to what has been above. For example, instead of or in addition to the information name, time information such as on time at which an agreement phenomenon is detected may be registered. Furthermore, either the user set or the agreement degree may be registered in the agreement degree information DB 684. Besides, user sets whose agreement degrees are equal to or less than the highest agreement degree may be registered in the agreement degree information DB 684 as well.

[2-6-3. Related Keyword Selection Process]

Figure 18:
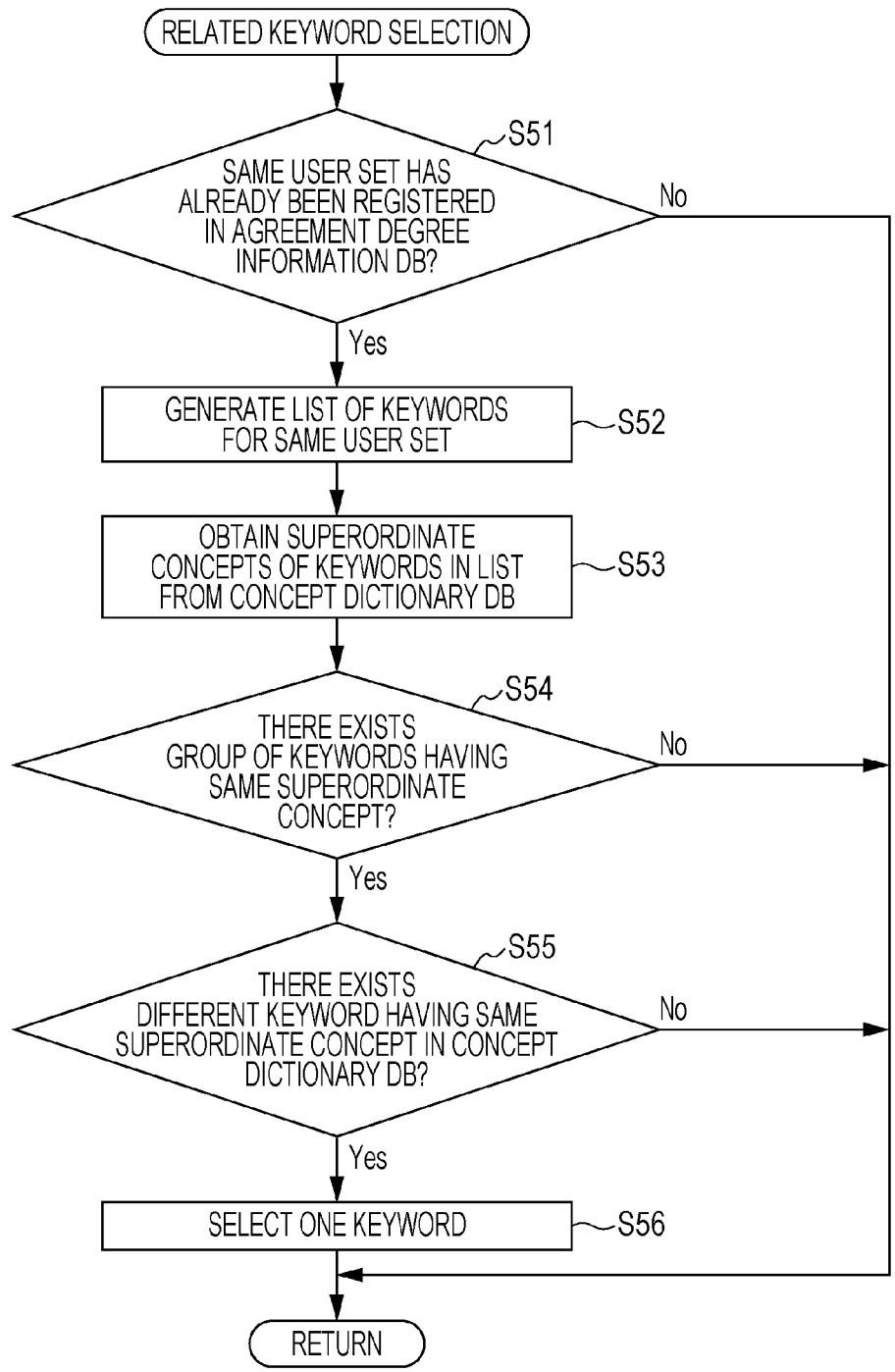
FIG. 18 is a flowchart illustrating a related keyword selection process to be performed in the related information display process.

Using FIG. 18, descriptions will be provided for the related keyword selection process in step S23 in the related information display process (FIG. 13). FIG. 18 is a flowchart illustrating the related keyword selection process (S23).

The process according to the flowchart in FIG. 18 is performed by the server controller 670 as functioning as the related keyword selector 960.

To begin with, the server controller 670 determines whether a user set whose new agreement degree information has just been registered into the agreement degree information DB 684 was already registered in the agreement degree information DB 684 in connection with different agreement degree information (S51). For example, in the agreement degree information DB 684 illustrated in FIG. 17, the user set "Yamada and Suzuki" is registered in connection with not only agreement degree information "Idea 4" but also agreement degree information "Idea 1." Thus, the server controller 670 proceeds from step S51 to "Yes."

If the server controller 670 determines that the same user set is registered in the agreement degree information DB 684 (Yes in step S51), the server controller 670 generates a list of keywords which are associated with the user set, based on the agreement degree information registered in the agreement degree information DB 684 (S52). For example, "tennis" in Idea 1 and "baseball" in Idea 4 are listed in connection with the user set "Yamada and Suzuki" in step S52.

Thereafter, referring to the beforehand-stored concept dictionary DB 682, the server controller 670 obtains a superordinate concept of the keywords included in the generated list (S53). For example, in the concept dictionary DB 682 illustrated in FIG. 14, a superordinate concept is obtained for each keyword in the list, such as a superordinate concept "sport" associated with the keyword "tennis" and a superordinate concept "sport" associated with the keyword "baseball."

Subsequently, the server controller 670 determines whether, among the keywords in the list, there exist a group of keywords having a common superordinate concept (S54). For example, based on the common superordinate concept "sport" of "tennis" and "baseball," the server controller 670 proceeds from step S54 to "Yes."

If the server controller 670 determines that there exist keywords having a common superordinate concept (Yes in step S54), the server controller 670 determines whether, in the concept dictionary DB 682, there exists a different keyword whose superordinate concept is the same as that of the group of keywords in the list (S55). For example, according to the concept dictionary DB 682, "sport" is the superordinate concept of "soccer" and "sumo wrestling" in addition to "tennis" and "baseball." For this reason, the server controller 670 proceeds from step S55 to "Yes."

If the server controller 670 determines that, in the concept dictionary DB 682, there exists a different keyword whose superordinate concept is the same as that of the group of keywords in the list (Yes in S55), the server controller 670 selects the different keyword from the concept dictionary DB 682 (S56). In the above example, as different keywords included in the superordinate concept "sport," two keywords "soccer" and "sumo wrestling" exist in the concept dictionary DB 682. In a case where multiple different keywords exist in the concept dictionary DB 682, one of the multiple different keywords (for example, "soccer") is selected, for example, according to the registration order.

The server controller 670 ends the process according to the flowchart with performing the process of step S56. In this case, the server controller 670 proceeds from step S24 to "Yes" in the related information display process (FIG. 13).

On the other hand, if the server controller 670 determines that, in the concept dictionary DB 682, there exists no different keyword whose superordinate concept is the same as that of the grouped keywords in the list (No in S55), the server controller 670 ends the process without performing the process of step S56. In this case, the server controller 670 proceeds from step S24 to "No" in the related information display process (FIG. 13).

Furthermore, if the server controller 670 determines that the same user set has not been registered in the agreement degree information DB 684 yet (No in step S51), similarly, the server controller 670 ends the process without performing the process of step S56. Moreover, if the server controller 670 determines that in the list, there exist no group of keywords having the same superordinate concept (No in step 54), similarly, the server controller 670 ends the process.

According to the above process, depending on the situation of registration in the agreement degree information DB 684 for each, a related keyword belonging to a superordinate concept of topics to be discussed by the users in an agreeing user set in the past and at present is selected (S56), and thereby, presentation information (related information) for showing related keywords is displayed (S25 in FIG. 13). This makes it possible to present the information for showing the related keywords related to the topic over which agreement arose in the user set.

If in the above-discussed step S54, there exist multiple keyword groups each having the same superordinate concept, the server controller 670 performs the determination of step S55 on each superordinate concept. In this case, if the server controller 670 determines that in the concept dictionary DB 682, there exists a different keyword belonging to at least one of the superordinate concepts, the server controller 670 proceeds to step S56.

In the above-discussed process, the superordinate concepts related to the keywords included in the list generated for the specific user set are obtained in steps S53 and S54. Instead of or in addition to them, the server controller 670 may be configured to determine whether, with regard to the same user set, a keyword which belongs to the superordinate concept of the keyword newly registered into agreement degree information DB 684 has already been registered.

[3. Effects and the Like]

As discussed above, in the conference support method of the embodiment, the local server 310 obtains condition information representing the conditions of the respective users 200 to 202 participating in the conference which are detected by the multiple sensor devices. In the method, furthermore, with regard to a user set including at least two of the users as elements, based on condition information on the at least two users included in the user set which is part of the foregoing obtained condition information on all the users, the local server 310 calculates an agreement degree representing a degree at which the at least two users included in the user set agree to each other (920). In the method, furthermore, based on the result of the agreement degree calculation, the local server 310 provides presentation information to the display device 315 (930).

According to the above-discussed information processing method, the conference support method makes it possible to present information depending on the degree at which the at least two users agree to each other.

For example, in various conferences with multiple participants, the conference support method makes it possible to find groups of participants sharing commonality in terms of information on topics, agenda and the like which are supported or not supported. For this reason, the information processing method makes it possible to determine whether such information is supported by all the participants on the spot or strongly supported by some participants alone. For example, the information processing method makes it possible to extract a group of participants sympathizing with data or ideas in a product monitoring conference, help use the extracted group information for subsequent product development, and thereby facilitate the product development effectively.

In the embodiment, the conference support method further includes the local server 130's recording information on an agreement degree and a user set associated together in the memory based on a result of calculating the agreement degree for the user set (950). The conference support method is capable of presenting information depending on changes in the user sets' agreement degrees during a conference, in the form of the presentation information provided from the local server 310 using the information recorded in the memory.

Furthermore, in the embodiment, the local server 310 obtains information on the condition of each of the users which is detected using the multiple sensor devices during a predetermined period. Moreover, based on the obtained condition information on each of the users, the local server 310 detects whether an agreement phenomenon in which two or more users agree to each other arises during the predetermined period.

If it is detected that an agreement phenomenon arises, the local server 310 selects at least one of the multiple user sets which are the multiple subsets included in the universal set including all the users as elements.

The multiple subsets are all subsets each including at least two of the multiple elements included in the universal set, among all subsets in the universal set.

The local server 310 calculates the agreement degree of the selected at least one user set.

It should be noted that the agreement degree calculation does not necessarily have to be performed at the time of the agreement phenomenon detection, and may be repeatedly performed, for example, at a predetermined cycle. Furthermore, the agreement phenomenon detection process may be performed depending on a process of determining whether the calculated agreement degree value is greater than a threshold value, or the like.

Furthermore, in the embodiment, the local server 310 may be configured to select at least two of the multiple user sets. The local server 310 may be configured to calculate the agreement degrees of the selected at least two user sets.

The local server 310 may be configured to identify a user set with an agreement degree which is the highest among the agreement degrees of the selected at least two user sets. The local server 310 may be configured to provide the display device 315 with information on the identified user set as presentation information. The display device 315 presents the presentation information (FIGS. 10A and 10B).

Thereby, it is possible to find a group (user set) which supported (or did not support) specific information more strongly than any other group. By this, for example, the organizer of a product monitoring conference can efficiently find a group of participants whom the organizer wants to answer additional questions or questionnaire.

Furthermore, in the embodiment, all the user sets may be selected as the at least two user sets.

Thereby, the agreement degree can be calculated for each combination of users who are expected to share agreement without omission.

Moreover, in the embodiment, information on the user sets and agreement degrees calculated for the respective user sets may be provided as the presentation information.

This makes it possible to check the agreement degree for each user set. Incidentally, the presentation information may be time-series information, or information on a user set with the highest agreement degree within the predetermined period.

The conference support method in the embodiment may be such that: the multiple sensor devices include one or more microphones; and the local server 310 obtains voice data corresponding to voices picked up by the one or more microphones. When the local server 310 detects an agreement phenomenon, based on voice data, the local server 310 may extract a keyword related to a topic about which at least two users sharing agreement talk. The presentation information may include related information (2201, 2202) related to the extracted keyword.

This makes it possible to present the related information in which the agreeing user set are likely to be interested during the conference. Thereby, it is possible to make the discussion among the user set become active and lively, and to assist the user set in developing ideas. For example, the organizer of a product monitoring conference can be more likely to obtain new ideas from discussion among a monitored group of participants in the conference by: providing the group with information related to a topic which the group are discussing; and thereby making the discussion more active and lively.

Moreover, in the embodiment, the display device 315 displays the presentation information to be provided from the local server 310. This makes it possible to visually present the presentation information based on the agreement degree calculation results.

It should be noted that instead of or in addition to the display device 315, a voice output device may output the presentation information, provided from the local server 310, in the form of voice. Examples of the voice output device include an earphone, a headphone, and a speaker.

For example, the presentation information may be outputted in the form of voice from an earphone, a headphone, a speaker or the like for a specific user such as a conference organizer. Otherwise, sound effects or audio announcements may be outputted in the audio form depending on agreement degrees and the like calculated during the conference on the spot. Furthermore, the information presentation device may include, for example, actuators or the like which produce vibrations to the chairs of a user set from which an agreement phenomenon is detected.

Moreover, the conference support system of the embodiment includes the multiple sensor devices 300 to 305, the local server 310 and the display device 315. For each user set including at least two of the users, the local server 310 calculates the agreement degree based on the conditions of the users in the user set and detected by the sensor devices 300 to 305, and provides presentation information based on the agreement degree calculation result. The display device 315 presents the presentation information provided from the local server 310.

The foregoing information processing system makes it possible to present information depending on the degree of agreement between at least two of the users.

In addition, the local server 310 of the embodiment includes the communication circuit 650, and the server controller 670. The communication circuit 650 obtains the result of detecting the condition of each of the users participating in the conference from the sensor devices 300 to 305. For each user set including at least two of the users, based on the conditions of the users in the user set as the obtained detection result, the local server 310 calculates the agreement degree, and provides presentation information based on the agreement degree calculation result.

The foregoing information processing system makes it possible to present information depending on the degree of agreement between at least two of the users.

(Embodiment 2)

Figure 19:
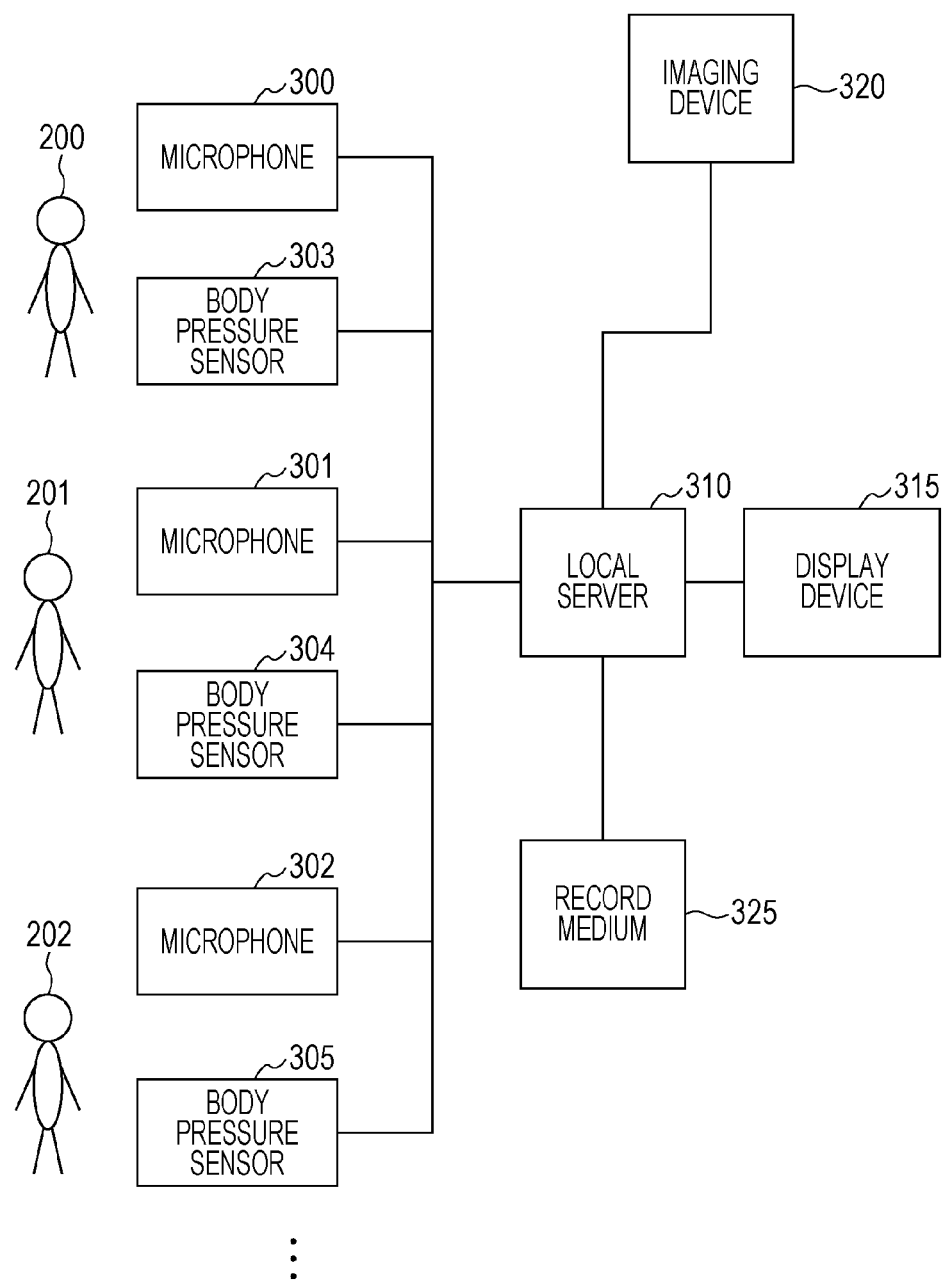
FIG. 19 is a diagram illustrating a configuration of a conference support system of Embodiment 2.
Figure 20:
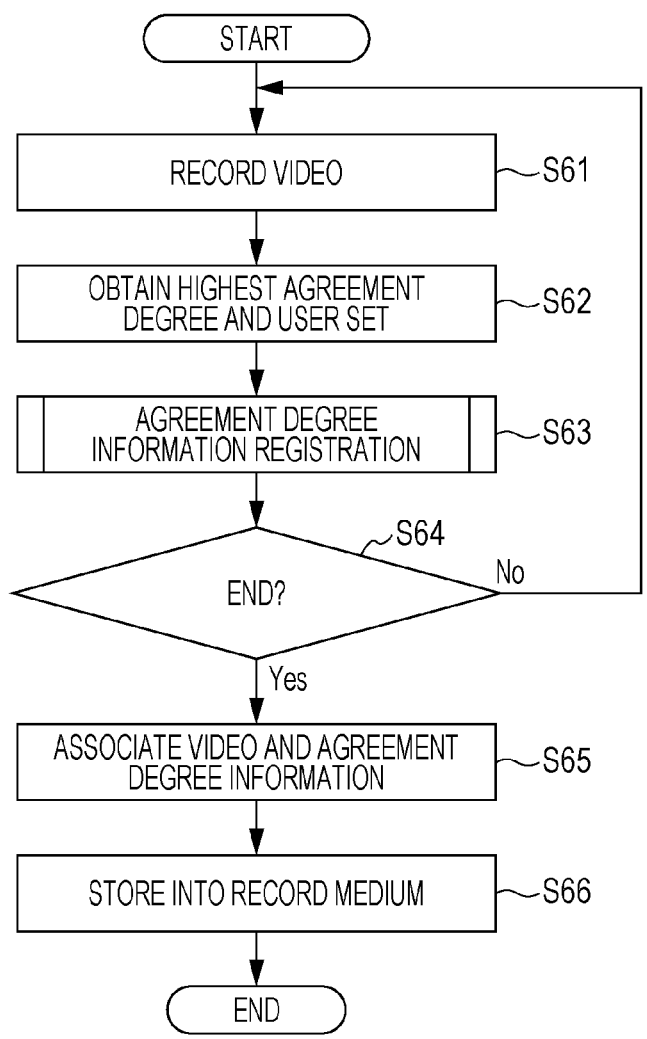
FIG. 20 is a flowchart illustrating how a local server works in Embodiment 2.

Embodiment 2 will discuss an example where agreement degree information is used as information to be added to a video of an ongoing conference. Referring to FIGS. 19, 20 and 21, descriptions will be hereinbelow provided for a conference support method and a conference support system of (Embodiment 2)

FIG. 19 is a diagram illustrating a configuration of the conference support system of Embodiment 2. The conference support system of the embodiment shoots images of a space in which multiple users are present, and generates presentation information by using agreement degree information as metadata (additional information) to be added to the shot images. As illustrated in FIG. 19, the system includes an imaging device 320, and a record medium 325 in addition to the configuration of the conference support system (FIG. 2) of Embodiment 1.

The imaging device 320 includes, for example, a camera device having a wireless communication function. In the embodiment, the imaging device 320 shoots images of the space in which the users are present. The space in which the users are present is a space in which the users have a discussion (hereinafter referred to as a discussion space), and its examples include a conference room and a place in which to hold a monitoring conference. In the discussion space, the users as the conference participants, documents in print to be placed on desks and the like, a screen onto which a projector projects documents, a display on which to display documents, a white board on which to write down contents of the discussion, objects such as products to be monitored, or their combinations are present. In the embodiment, images of how the conference is going are shot as images of activities in the discussion space. Furthermore, the imaging device 320 transmits video data as a result of taking the images to the local server 310 through the wireless communication from time to time. Incidentally, the video data may be still image data or moving image data.

The record medium 325 includes, for example, a hard disk drive (HDD) and a solid state drive (SSD). In the embodiment, the record medium 325 records moving images, which are obtained by the shooting by the imaging device 320, in association with agreement degree information. The record medium 325 may be a portable record medium such as a compact disk (CD) or a digital versatile disk (DVD).

FIG. 20 is a flowchart illustrating how the local server 310 works in the embodiment. The process according to the flowchart is performed in parallel to the agreement phenomenon detection process (FIG. 8) and the agreement degree calculation process (FIG. 9) of Embodiment 1.

To begin with, the server controller 670 obtains the video data from the imaging device 320, and temporarily records a moving image based on the obtained video data into the memory 640 (S61). At the same time, the server controller 670 records time information on a time at which the image data are obtained together with the moving image. The time information may be regulated by the actual time, or by the number of moving image frames based on the video data.

Thereafter, based on the calculation result from the agreement degree calculation process (FIG. 9), the server controller 670 obtains the highest agreement degree at the time of obtaining the video data, and a user set with the highest agreement degree (S62).

Subsequently, based on the obtained various information, the server controller 670 performs an agreement degree information registration process (S63). The process is performed, for example, in the same way as illustrated in FIG. 16. In the embodiment, the time information to be used to synchronize the registering of the agreement degree information with the recording of the moving image is included in the items to be registered.

As illustrated in FIG. 21, an agreement degree information DB 684A of the embodiment includes a "time information" data item in addition to the data items in the agreement degree information DB 684 whose example is illustrated in FIG. 17. The time information represents a time for the synchronization with the moving image. In step S63 in FIG. 20, the server controller 670 registers, for example, the time of obtaining the video data as the "time information."

After that, for example, based on a beforehand-set scheduled conference closing time, the server controller 670 determines whether the conference has closed (S64). If the server controller 670 determines that the conference has not closed yet (No in step S64), the server controller 670 repeats the processes in and after the step S61. The determination in step S64 may be performed based on a predetermined instruction from a user, or the end of the reception of the video data from the imaging device 320.

If the server controller 670 determines that the conference has closed (Yes in step S64), the server controller 670 associates the agreement degree information registered in the agreement degree information DB 684A with the temporarily-stored moving image (S65). Based on the time information included in the agreement degree information DB 684A, the server controller 670 associates the agreement degree information and the video in the moving image which are registered at the same time. For example, the server controller 670 associates only the agreement degree information on the highest agreement degree which exceeds a predetermined value with the video. The predetermined value is set, for example, at a value representing an agreement degree at which a discussion about a topic is considered as becoming conspicuously active and lively.

After that, the server controller 670 stores the associated moving image and agreement degree information into the record medium 325 (S66). The server controller 670, for example, deletes agreement degree information which is not associated with the moving image in the agreement degree information DB 684A, and writes the associated moving image and agreement degree information into the record medium 325.

The server controller ends the process according to the flowchart with completing the storage into the record medium 325 in step S66.

The foregoing process makes it possible to obtain the moving image which shoots how the conference is going, and which is associated with a user set sharing agreement during the conference and its agreement degree. The moving image stored in the record medium 325 can be displayed, for example, by the display device 315 or the like depending on the necessity.

The moving image like this makes it possible to collects scenes in which a specific user set shares agreement by using the user set associated with the moving image as an identifier, and to collect scenes in which discussion becomes active and lively based on agreement degrees. This makes it easy to edit a digest of the moving image of how the conference went, and makes it possible to assist in preparing the minutes of the conference.

As discussed above, the moving image stored in the record medium 325 may be displayed, for example, by the display device 315 or the like depending on the necessity. Because of the agreement degree information associated as the metadata, it is possible to provide information support using the presentation information to be presented together with the moving image.

In the foregoing process, when the server controller 670 obtains the highest agreement degree in step S62, the server controller 670 may skip the agreement degree information registration process (S63) if the obtained highest agreement degree is equal to or less than a predetermined value. Furthermore, if the server controller calculates no new agreement degree in the agreement degree calculation process (FIG. 9) to be performed in parallel, the server controller 670 may skip the process of step S63 as well.

Moreover, the agreement degree and the user set both associated with the moving image are not limited to the highest agreement degree and the user set with the highest agreement degree, and may be, for example, user sets each with an agreement degree equal to or greater than a predetermined value and their agreement degrees. In this case, in step S62, the server controller 670, for example, determines whether each calculated agreement degree is equal to or greater than the predetermined value, and obtains user sets each with an agreement degree determined as being equal to or greater than the predetermined value and their agreement degrees.

Besides, according to the foregoing discussion, the agreement degree information is recorded in association with the moving image of how the conference is going. However, the recording of the agreement degree information is not limited to this. For example, the agreement degree information may be recorded in association with presentation data during the conference. The configuration may be, for example, such that: the imaging device 320 captures images of what the conference looks like when the presentation data are released; based on the moving image obtained by the image capturing, a time of releasing each slide in the presentation data is obtained; and based on the time information, the association of the agreement degree is performed. The time information on each slide may be obtained by data communication between an information device such as a personal computer (PC) which reproduces the presentation data and the local server 310.

As discussed above, the conference support method of the embodiment includes the step in which the local server 310 obtains the video which is obtained by the imaging device 320's capturing the space in which the multiple users are present. The method includes the step in which, based on the agreement degree calculation result, the local server 310 records the agreement degree information into the record medium 325 in association with the video obtained by the image capturing.

The foregoing information processing method makes it possible to link the agreement degrees to how the conference is going.

In the embodiment, the agreement degree information includes information on at least either the calculated agreement degree or the user set with the calculated agreement degree.

This makes it possible to present information on at least either the agreement degree calculated while capturing the images of how the conference is going or the user set with the calculated agreement degree.

Furthermore, in the embodiment, the calculated agreement degrees represented by the agreement degree information or the agreement degrees of the user sets may be equal to or greater than a predetermined value.

This makes it possible to easily present an agreement degree for each scene in the video of the conference in which the agreement degree is calculated as being equal to or greater than the predetermined value.

(Other Embodiments)

Although the foregoing embodiments use the multiple sensor devices 300 to 305, the conditions of the respective users may be detected using a single sensor device. For example, as the sensor device, an array microphone may be installed in a place such as a ceiling which the voices uttered by the multiple users reach. In this case, which user utters which voice may be identified by performing voice analysis on voice data from the array microphone.

Furthermore, although the microphones 300 to 302 and the body pressure sensors 303 to 305 are discussed as examples of the sensor devices, the sensor devices are not limited to these examples. For example, the sensor devices include a camera, a distance image sensor such as a Kinect, a wearable velocity or acceleration sensor, a blood pressure sensor, and a heart rate sensor. Furthermore, the condition of each user may include not only the foregoing external condition but also the internal condition such as the blood pressure or the heart rate.

Moreover, although the foregoing embodiments have discussed the example in which the conference support method and the conference support system are applied to the conference of the three users 200 to 202, neither the method nor the system is not limited to the conference of the three users. The method and the system may be applied, for example, to a conference in which four or more users participate.

Besides, although the foregoing embodiments have discussed the example in which the method and the system are applied to the conference in which the participating users 200 to 202 physically assemble around the table 205, the conference to which the method and the system are applied is not limited to a conference in which the participants physically assemble, and may be, for example, a television conference, a telephone conference, a chat conference, or the like.

The foregoing comprehensive and specific embodiments may be realized using the system, the method, the integrated circuits, the computer program or the record medium such as a computer-readable CD-ROM. Otherwise, the foregoing comprehensive and specific embodiments may be realized by arbitrarily combining the system, the method, the integrated circuits, the computer program, and the record medium.

In addition, the present disclosure includes the foregoing various methods. An aspect of the present disclosure may be a computer program to be executed by a computer to realize these methods, or may be a digital signal representing the computer program.

Furthermore, an aspect of the present disclosure may be the computer program or the digital signal as recorded in a computer-readable record medium, for example, a flexible disk, a hard disk, a CD-ROM, a MO, a DVD, a DVD-ROM, a DVD-RAM, a Blu-ray Disc (BD) (registered trademark), a USB memory, a memory card such as an D card, or a semiconductor memory. Moreover, the present disclosure may be the digital signal which is recorded in these record media.

Further, an aspect of the present disclosure may be the computer program or the digital signal as transmitted through an electric communication line, a wireless or wired communication line, a network represented by the Internet, data broadcasting, or the like.

Besides, an aspect of the present disclosure may be a computer system which includes a microprocessor and a memory such that: the memory stores the computer program; and the microprocessor operates according to the computer program.

Moreover, the foregoing apparatus may be carried out by an independent different computer by recording the program or the digital signal into the record medium and transporting the thus-recorded program or digital signal, or by transporting the program or the digital signal through the above-mentioned network or the like.

In addition, the figures used above are provided merely as examples in order to specifically explain the present disclosure. The present disclosure is not limited by the figures provided as examples.

In addition, the division of the functional blocks in each block diagram is an example. Multiple functional blocks may be realized as a single functional block. One functional block may be divided into multiple functional blocks. One or some functions may be moved from one functional block to another functional block. Furthermore, functions of multiple functional blocks having similar functions may be processed in parallel or in time division by single hardware or software.

Moreover, the sequence of performing the multiple steps included in the conference support method is provided as an example in order to specifically explain the present disclosure, may be different from what have been discussed above. What is more, some steps may be performed simultaneously (in parallel) with other steps.

Although the conference support apparatus of one or more aspects have been discussed based on the embodiments, the present disclosure is not limited to the embodiments. Embodiments which those skilled in the art obtain by applying various conceivable modifications to the foregoing embodiments and embodiments which those skilled in the art obtain by combining components of the different embodiments are also included in the one or more aspects as long as such embodiments do not deviate from the gist of the present disclosure.

The information processing method, the information processing system and the information processing apparatus according to the present disclosure are applicable to information support in various situations in which multiple users assemble.

What is claimed is:

1. An information processing method, comprising:
    acquiring, by a communication circuit, a video in a predetermined period, the video being obtained by a camera that captures an image of a space in which users are present;
    acquiring, by the communication circuit, a plurality of pieces of condition information indicating amounts corresponding to conditions of the users in the space, the amounts corresponding to the conditions being detected in the predetermined period by one or more sensor devices;

determining that an agreement phenomenon, in which at least two users in the space agree to each other in the predetermined period, occurs by detecting that the amounts corresponding to the conditions, indicated by at least two pieces of condition information for the at least two users that agree to each other, exceed a first predetermined value;

when the agreement phenomenon occurs, with regard to each of user sets including at least two users in the space as elements, calculating, by a controller, an agreement degree representing a degree of agreement between the at least two users as the elements included in a corresponding user set, based on the at least two pieces of condition information for the at least two users as the elements included in the corresponding user set, wherein the at least two pieces of condition information is included in the plurality of pieces of condition information for all the users in the space;

based on a result of the calculating of agreement degrees for each of the user sets, recording, by the controller, information on the agreement degrees in a memory in association with the video obtained by the camera that captures the image; and providing, by the controller, presentation information based on the result of the calculating of the agreement degrees to an information presentation device to present the presentation information.

2. The information processing method according to claim 1, further comprising based on the result of the calculating of the agreement degrees, further recording, by the controller, the information on the agreement degrees in the memory in association with information on the user sets.

3. The information processing method according to claim 1, wherein, the user sets include a universal user set including, as elements, all the users in the space and include all subsets of the universal user set each of which includes, as elements, the at least two of the users in the space, and wherein, the information processing method further includes:
identifying one of the user sets for which an agreement degree is equal to or higher than a second predetermined value or is highest among the agreement degrees calculated for the user sets, and wherein information indicating users as elements included in the identified one of the user sets is provided as the presentation information.

4. The information processing method according to claim 3, wherein
the agreement degree for the identified one of the user sets is further provided as the presentation information.

5. The information processing method according to claim 1, further comprising:
acquiring, by the communication circuit, a plurality of pieces of data picked up by the one or more senor devices in the predetermined period in the space;
determining that that the agreement phenomenon occurs by detecting, from the plurality of pieces of data, that at least two pieces of data for the at least two users in the space agree to each other; and when the agreement phenomenon occurs, extracting a keyword related to a content of a discussion among the at least two users who agree to each other based on the at least two pieces of data, wherein a piece of information related to the keyword is provided as the presentation information.

6. The information processing method according to claim 1, wherein
in the providing, the presentation information is provided to any one of a display device and a voice output device.

7. An information processing system comprising:
one or more sensor devices that detect, in a predetermined period, conditions of users who are present in a space, and output a plurality of pieces of condition information indicating amounts corresponding to the conditions of the users; and
an information processing apparatus including,
a communication circuit that acquires a video and the plurality of pieces of condition information, the video being obtained by a camera that captures, in the predetermined period, an image of the space in which the users are present, and
a controller that,
determines that an agreement phenomenon, in which at least two users in the space agree to each other in the predetermined period, occurs by detecting that the amounts corresponding to the conditions, indicated by at least two pieces of condition information for the at least two users that agree to each other, exceed a first predetermined value;
when the agreement phenomenon occurs, with regard to each of user sets including the at least two users in the space as elements, calculates an agreement degree representing a degree of agreement between the at least two users as the elements included in a corresponding user set, based on the at least two pieces of condition information for the at least two users as the elements included in the corresponding user set, wherein the at least two pieces of condition information is included in the plurality of pieces of condition information for all the users in the space,
based on a result of calculation of agreement degrees for each of the user sets, records information on the agreement degrees in a memory in association with the video obtained by the camera that captures the image, and
provides presentation information based on the result of the calculation of the agreement degrees; and
an information presentation device that presents the presentation information.

8. An information processing apparatus comprising:
a communication circuit that acquires a video and a plurality of pieces of condition information, the video being obtained by a camera that captures, in a predetermined period, an image of a space in which users are present, the plurality of pieces of condition information indicating amounts corresponding to conditions of the users, the conditions of the users being detected in the predetermined period by one or more sensor devices; and
a controller which,
determines that an agreement phenomenon, in which at least two users in the space agree to each other in the predetermined period, occurs by detecting that the amounts corresponding to the conditions, indicated by at least two pieces of condition information for the at least two users that agree to each other, exceed a first predetermined value;

when the agreement phenomenon occurs, with regard to each of user sets including the at least two users in the space as elements, calculates an agreement degree representing a degree of agreement between the at least two users as the elements included in a corresponding user set, based on the at least two pieces of condition information for the at least two users as the elements included in the corresponding user set, wherein the at least two pieces of condition information is included in the plurality of pieces of condition information for all the users in the space, based on a result of calculation of agreement degrees for each of the user sets, records information on the agreement degrees in a memory in association with the video obtained by the camera that captures the image, and provides presentation information based on the result of the calculation of the agreement degrees to an information presentation device to present the presentation information.

9. The information processing system according to claim 7, wherein
the information presentation device is a projector, and
the projector projects the presentation information on a surface of an object around which the users are present.

* * * * *